United States Patent
De Vos et al.

(10) Patent No.: US 6,760,917 B2
(45) Date of Patent: *Jul. 6, 2004

(54) SYSTEM FOR INFORMATION ON DEMAND

(75) Inventors: Johan De Vos, Brussels (BE); Claude Barraud, Brussels (BE)

(73) Assignee: Sony Europa B.V., Badhoevedorp (NL)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/930,472

(22) PCT Filed: Mar. 28, 1996

(86) PCT No.: PCT/EP96/01412
§ 371 (c)(1),
(2), (4) Date: Dec. 29, 1997

(87) PCT Pub. No.: WO96/31057
PCT Pub. Date: Oct. 3, 1996

(65) Prior Publication Data
US 2003/0110505 A1 Jun. 12, 2003

(30) Foreign Application Priority Data
Mar. 31, 1995 (EP) .............................................. 95200819

(51) Int. Cl.[7] .............................................. H04N 7/173

(52) U.S. Cl. ......................................... 725/94; 725/95

(58) Field of Search ............................ 345/327; 348/7, 348/6, 12, 13, 10; 455/5.1, 6.1, 6.2, 6.3, 4.2; 725/87, 91, 92, 93, 94, 95; H04N 7/10, 7/14; H04H 1/00, 1/14

(56) References Cited

U.S. PATENT DOCUMENTS

| | | | | |
|---|---|---|---|---|
| 4,141,066 A | * | 2/1979 | Kelles | 700/81 |
| 4,463,380 A | * | 7/1984 | Hooks, Jr. | 358/160 |
| 5,027,356 A | * | 6/1991 | Nakamura et al. | 371/32 |
| 5,341,474 A | * | 8/1994 | Gelman et al. | 395/200 |
| 5,504,883 A | * | 4/1996 | Coverston et al. | 707/202 |
| 5,506,615 A | * | 4/1996 | Awaji | 348/13 |
| 5,512,934 A | * | 4/1996 | Kochanski | 725/97 |
| 5,521,841 A | * | 5/1996 | Arman et al. | 345/112 |
| 5,594,789 A | * | 1/1997 | Seazholtz et al. | 348/13 |
| 5,621,456 A | * | 4/1997 | Florin et al. | 725/43 |
| 5,673,264 A | * | 9/1997 | Hamaguchi | 348/13 |
| 5,734,589 A | * | 3/1998 | Kostreski et al. | 348/7 |
| 5,740,075 A | * | 4/1998 | Bigham et al. | 348/7 |
| 5,790,173 A | * | 8/1998 | Strauss et al. | 348/7 |
| 6,240,552 B1 | * | 5/2001 | De Vos et al. | 725/92 |

* cited by examiner

*Primary Examiner*—Vivek Srivastava
(74) *Attorney, Agent, or Firm*—Frommer Lawrence & Haug LLP; William S. Frommer; Dennis M. Smid

(57) ABSTRACT

The present invention provides a system for serving information data such as video data to one or more users, comprising: one or more storage medium units for storing data of said information data; one or more end devices for receipt of said information data by the user; managing means for managing distribution of said data to said end device, the managing means being capable of receiving demand data form said user and related to data selected by the user in the end device, and which managing means output distribution control data including channel information of the selected information data and routs information from the end device; and least one ATM switch for connecting the storage medium unit, the end device and the managing means, and for routing the data from the storage medium unit and the distribution control data from the managing means.

28 Claims, 19 Drawing Sheets

| timing zone# / unit# | 1 | | | | 2 | | | | 3 | | | | 1 | | |
|---|---|---|---|---|---|---|---|---|---|---|---|---|---|---|---|
| buffer | 1 | 2 | 3 | 4 | 5 | 6 | 7 | 8 | 9 | 10 | 11 | 12 | 13 | 14 | 15 |
| b1 value | 1 | 2 | 3 | 4 | 1 | 2 | 3 | 4 | 1 | 2 | 3 | 4 | 1 | 2 | 3 |
| b1 vc# | 1 | 1 | 1 | 1 | 2 | 2 | 3 | 2 | 3 | 3 | 3 | 3 | 1 | 1 | 1 |
| b2 value | 9 | 10 | 11 | 12 | 9 | 10 | 11 | 12 | 9 | 10 | 11 | 12 | 9 | 10 | 11 |
| b2 vc# | 2 | 2 | 2 | 2 | 3 | 3 | 3 | 3 | 1 | 1 | 1 | 1 | 2 | 2 | 2 |
| b3 value | 5 | 6 | 7 | 8 | 5 | 6 | 7 | 8 | 5 | 6 | 7 | 8 | 5 | 6 | 7 |
| b3 vc# | 3 | 3 | 3 | 3 | 1 | 1 | 1 | 1 | 2 | 2 | 2 | 2 | 3 | 3 | 3 |

FIG. 7

SYSTEM FOR INFORMATION ON DEMAND

BACKGROUND OF THE INVENTION

Conventional cable tv systems deliver video data from a distribution company through a cable to monitors of a number of viewers. Although nowadays many programs are distributed through many channels by each cable tv company, the user or viewer has to wait until the desired program is started and transmitted through a selected channel.

Recently, also interactive video systems have been proposed. In such interactive video system a viewer can chose a desired movie to be displayed on the monitor of said viewer. In such video-on-demand system a direct connection to the monitor or end device of a user is established, whereafter a demanded movie can be viewed by the end user.

In this known system it is however virtually impossible to upscale the system after it has been established e.g. by a distribution company. When the number of members for such a system increases and the number of demanded videos is increased, a new interactive video system has to be built.

SUMMARY OF THE INVENTION

The present invention provides a system for serving information data to one or more end devices of one or more users, comprising:
  one or more storage medium units for storing information data;
  managing means for managing distribution of the information data to any one of the end devices, wherein the managing means receive demand data relating to information data selected by the user through his device, and wherein the managing means output distribution control data including channel information of the selected information data and routing information for said end device; and
  routing means for connecting the storage medium unit to the end device, and for routing the information data from the storage medium unit and the distribution control data from the managing means.

This system according to the present invention provides a sort of platform and can operatively be connected to an end user through a public network, can operate as a stand alone system operatively connected to end devices, in which latter case the system according to the present invention is also provided with navigation devices for presenting possible choices for an end user entering the system.

Preferably the routing means comprise at least one ATM switch. The basics and standards of ATM (Asynchronous Transfer Mode) are laid down in recommendations I.150 and I.327 as published in March 1993 by the International Telecommunication Union. ATM is generally used for addressing a specific packet-oriented transfer mode which uses asynchronous time division multiplexing techniques. The multiplexed information flow is organized into blocks of fixed size, where said blocks are referred to as cells. A cell consists of an information field and a header. The primary role of the header is to identify cells belonging to the same virtual channel within the asynchronous time division multiplex.

Preferably said information data is video and/or audio data although the present invention is not limited to this application. A system according to the present invention may also comprise applications for video-games, library functions, databanks etc., although a first promising application field relates to video on demand services.

In case the information server system according to the present invention is connected to a public network, the demand data preferably includes a public address to be assigned to the selected information data.

Preferably the managing means provide program data for information retrieval to the end device, so that an end device will be downloaded with such program data from the system. This feature provides the additional advantage that the end device only needs to include very little software for starting up purposes etc.

Although in a small scale configuration, such as in an hotel accommodation or to like, the information services system according to the present invention may comprise only one storage medium unit (and even one end device), the system according to the present invention preferably comprises at least one second storage medium unit. In such a case the managing means comprise a table for storing data representing information data allocation to the first and second storage medium unit on basis of demand data from an end device. In this way the managing means manage the switching of the ATM switch for establishing virtual channels between the end device and the storage medium unit.

Preferably the storage medium unit according to the present invention comprises;
  memory means for storing video and/or audio data;
  table means for memorizing data representing a relationship between the routing information and the video and/or audio data stored in the storage means;
  program memory means for storing program data for control of the operation of the storage medium unit;
  control means for controlling the memory means, the table means and the program memory means according to program data and for outputting one or more control signals to the end device; and
  at least one interface for transmitting the video and/or audio data with the routing information and a control signal in the form of one or more packets to the routing means and for receiving program data for operation of the storage medium unit in the form of one or more packets from the routing means. The memory means can comprise a magneto-optical (MO) disc or hard disc which is more agile than a MO disk. Also, preferably the routing information is supplied to the ATM interface of the storage medium unit.

Preferably the information server system in a video and/or audio data application is capable of providing still mode, fast forwards mode, reverse mode, fast reverse mode as in VCR (video cassette recorder) and a mosaic mode operation.

To prevent time delay even in less agile memory means of the storage medium unit, preferably video and/or audio data is divided in a predetermined number of data groups arranged in a sequence different from the original sequence.

BRIEF DESCRIPTION OF THE DRAWINGS

Further details, features and advantages of the present invention will be described in the following referring to the next drawings with shell diagrammatic representations of embodiments of the present invention, and wherein

FIG. 7 is a diagram of the timing of an ATM interface in the storage medium unit;

DETAILED DESCRIPTION OF THE PREFERRED EMBODIMENT

The following description in which reference is made to the figures, describes a combination of hardware and software; it should be understood that some hardware components may be combined into a single hardware component such as a CPU where functions are time multiplexed. It should also be understood that connections between logic (software) units can be more complex than is shown schematically in the figures.

Figure 1:
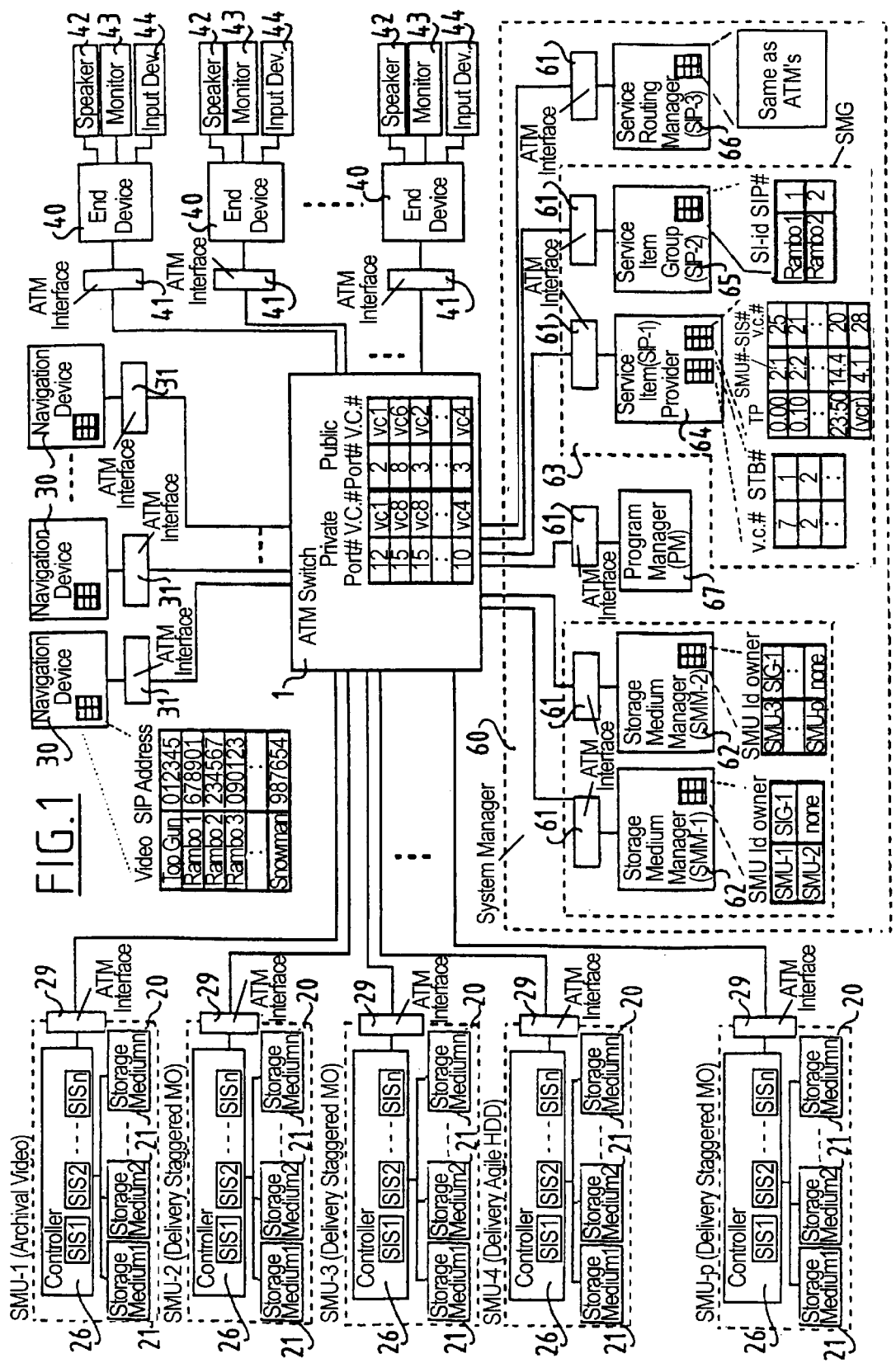
FIG. 1 is a representation of an entire system for information on demand.

FIG. 1 shows an entire configuration of a preferred embodiment of an interactive communication system according to the present invention, comprising: an ATM switch 1 (as example only: ForeRunner ™ ASX-200 of Fore Systems Inc., Warrendale, Pa., USA); storage medium units 20 (SMU); end devices 40; a system manager 60 and navigation devices 30. ATM switch 1 connects the storage medium units 20, the end devices 40, the system manager 60 and the navigation devices 30 to each other, selectively, by using virtual channel connections and data is transferred to and from these components in a form of ATM packets consisting of a 5 byte cell header including routing information and a 48 byte information field through ATM user/network interfaces provided between each device and ATM switch 1. ATM switch 1 has a conversion table of routing information such as Virtual Channel Identifier and by changing the routing information of each incoming ATM packet to the routing information designating the output virtual channel, the ATM packet can be transferred to the correct destination. ATM switches are known and further explanation is omitted here.

The interactive communication system will be explained below, specifically referring to the embodiment, where video-on-demand (VOD) service is supplied to users. It should, however, be noted here that other applications, such as teleshopping, games and other types of information exchange, are equally possible. Such services can be referred to as information-on-demand services in general.

In the interactive communication system shown in FIG. 1 video signals and/or audio signals are stored in SMU's 20. Several embodiments of a SMU 20 will be described below in detail.

In FIG. 1 end devices 40 are set top boxes, each of which can communicate with the navigation devices 30, the system manager 60 and can decode video data (preferably compressed according to the MPEG-2 standard) and/or audio data from a SMU 20, and supply decoded video signal and/or audio signal to a monitor 43 and/or a speaker system 42. Each set top box or end device 40 has an input device 44, for example a keyboard or remote control, connected thereto. Preferably a set top box is provided with a graphical processor unit 49 for generating graphical data to monitor 43 to facilitate interaction with the user. Preferably the data for the graphical processing unit is supplied by the system manager through the ATM packets. A viewer can input instructions through the keyboard 44 or other suitable input device through the set top box 40. An embodiment of a set top box 40 will be described below in detail.

Navigation devices 30 can provide information on available video programs to any one of the set top boxes 40. Such information can be represented on the monitor 43 of the set top box 40 in a graphical way or by text, or by a combination thereof. Available video programs are video programs which can be selected by a viewer. Such requestable information will hereinafter be referred to as service items. An embodiment of a navigation device 30 is described below in more detail.

The system manager 60 manages operation of the interactive communication system by managing the operation of the ATM switch 1. An embodiment of the system manager 60 will be described below in more detail.

A major feature of an interactive communication system according to this preferred embodiment of the present invention is, that there are no restrictions on the hardware used or the operating system installed. Each set of communication operations is preceded by transmission of a control software program dedicated to such set of operations to a receiving and/or transmitting component, so that the receiving and/or transmitting component can optimally handle the incoming and/or outgoing communication following this down-load of said control software program.

In the embodiment of FIG. 1, at least one of the SMU's 20 is an archive SMU. In this embodiment the other SMU's 20 are delivery SMU's. The archive SMU stores many kinds of control software programs, video data and/or audio data. An archive SMU may comprise as memory means a tape or MO disc, while a delivery SMU preferably comprises an agile hard disc or MO disc as memory means. A MO disc is less agile than a hard disc but more agile than a tape. Each of the delivery SMU's stores separate parts of the data of the archive SMU. While the archive SMU may also be used as a SMU for delivery purposes, the delivery SMU's are used for VOD service. The system manager 60 downloads control software program to the archive SMU and the delivery SMU for a copy operation from the archive SMU to one of the delivery SMU's at the beginning of or in advance of a video on demand service. The installation of a delivery SMU by the archive SMU is shown in more detail in FIG. 18. The delivery SMU stores necessary video data from the archive SMU according to a command for the copy operation from the system manager 60, and in particular from the storage medium manager 62.

When the system manager 60 receives the demand data from an end device 40, the system manager 60 outputs to the ATM switch 1 distribution control data including information of virtual channels for the selected video data produced from the received demand data and an address of the end device 40. Next, the delivery SMU outputs the selected video data with the routing information for this end device 40. A software program for write-in operation is down-loaded from the system manager 60 to the RAM 24 of the SMU 20 before copy operation of the video data is performed. The CPU 22 of the SMU 20 controls write-in operation of the physical storage medium, 21 according to the software program for write-in operation stored in the RAM 24. Then the software program for write-in operation in the RAM 24 is replaced with a software program for read-out operation by down-load from the system manager 60 before video service starts. The CPU 22 controls read-out operation of the physical storage medium 21 according to the software program for read-out operation in video service.

The interactive communication system preferably comprises a plurality of (delivery) SMU's. In the system, the necessary video and/or audio data of a particular video and/or audio program is only copied from the archive SMU to one of the delivery SMU's, if the number of end devices 40 with the possibility to select the particular video and/or audio program is smaller than a predetermined number. On the other hand, the necessary video and/or audio data is also copied from the archive SMU or from the above delivery SMU to one or more of the other delivery SMU's, if more than the predetermined number of end devices have the possibility to select the particular video or audio program. The predetermined number can be determined based on certain statistics or real time monitoring of the number of end devices 40 requesting the particular video and/or audio program at a specific point in time.

The preferred embodiment of the present invention provides for the possibility that the number of end users is monitored in run time and that the configuration will dynamically change to prevent the system from overloading. When the number of end users increases, a new delivery SMU can be loaded from the archive SMU or another delivery SMU.

The system manager 60 preferably outputs backup control data, for the situation that one of the delivery SMU's malfunctions. Selected video and/or audio data is then output by another delivery SMU, which is not malfunctioning and is selected according to said backup control data. The conversion table of virtual channels in the ATM switch 1 is updated by the system manager 60 so that the input virtual channel of a possibly malfunctioning delivery SMU is changed to the virtual channel of another delivery SMU to provide the same video and/or audio data from the second SMU.

A user selects the desired navigation service and connects the end device 40 to a navigation device 30 providing the desired navigation service. Navigation data including a software program for displaying a menu of service items and identification data corresponding to each service item is downloaded preferably beforehand from at least one navigation device 30 selected by the end device 40. The monitor 43 of end device 40 displays such a menu of the available service items and, if necessary, corresponding identification data thereof. A menu from navigation device 30 may comprise video and/or audio information and control data, either in graphical form, textual format or a combination thereof, to facilitate the choice for the end user.

If a user selects a video and/or audio program through the input device 44 from the menu by pointing the desired video program with a pointer in the monitor 43 or by entering the identification data corresponding to the desired program, if displayed on the monitor 43, the identification data is supplied to the system manager 60 by the end device 40 via ATM switch 1. Such identification data may be a public address in case that the system manager 60 is connected to public ATM network. The navigation data may further include video data obtained from SMU 20 or navigation device 30. The navigation data down-loaded from a navigation device 30 can also contain information on other selectable navigation devices 30.

In a not shown embodiment an end device 40 can be connected to a navigation device through a public ATM switch, in which case such a navigation device can be selected through a public address. Through such a public navigation device it would also be possible to choose other navigation devices via the first publication navigation device.

The system manager 60 down-loads a VOD-software program for end devices 40 corresponding to a selected video program to the end device 40, after the system manager 60 receives identification data from the set top box 40. The system manager 60 also downloads a VOD-software program for the SMU's 20 corresponding to the selected video program to the SMU 20 via the ATM switch 1, before VOD service starts. The system manager 60 selects the SMU 20 and the most appropriate service items according to data representing video program allocation, for example in the form of a table, in the SMU's 20 and provides distribution control data including the information of the channel and the routing information corresponding to the selected video program to the selected SMU 20 so that the SMU 20 operates to reproduce the selected video program.

A controller 26 in the SMU 20 controls the physical storage medium 21, so that the physical storage medium 21 reproduces selected video data in a play mode selected by the end device 40 as described below in more detail. The reproduced video and/or audio data is supplied to ATM interface 29.

As explained earlier the physical storage medium may comprise a hard disc, a MO disc or tape on which a video movie is recorded.

An ATM interface 29 combines the reproduced video 35 and/or audio data preferably divided into cells each containing 48 bytes with the routing information stored in the memory of the SMU 20 in the form of ATM packets and outputs the same to the ATM switch 1.

Control data from the controller 26 such as control information for the end device 40 is supplied to the end device via the ATM interface 29 and the ATM switch 1. Control data from the end device 40 such as a required play mode is received through the ATM switch 1 and the ATM interface 29.

The ATM switch 1 routes the ATM packets between the end devices 40, the SMU's 20 and the system manager 60 according to the routing information attached to the ATM packets. The conversion table of the private ATM switch 1 is updated by the system manager 60.

In the not shown embodiment wherein a public ATM switch is used in combination with the private ATM switch, the virtual channel connection of the public ATM switch is established by using a public address at the start of the service.

In VOD operation, an end device 40 outputs control data requesting a play mode, such as normal play, fast forward play, reversed play, fast reversed play, still picture mode or more vague mode, to the ATM switch 1 through an ATM interface 41 according to the mode selection on the input device 44 by the user. The ATM switch 1 then routes the control data to the system manager 60. The system manager 60 outputs control data requesting the selected play mode to the ATM switch 1 through the ATM interface. SMU 20 reproduces the selected video data in the selected play mode. As a variation, the control data requesting a play mode can be routed from the end device 40 directly to the SMU 20.

In case of VCR options, the physical storage medium is preferably a hard disc, as such hard disc is more agile than the other mentioned physical storage mediums. As an alternative an MO-disk can be used, on which information is recorded in a staggered fashion, which will be described hereinafter.

The system manager 60 functionally comprises one or more storage medium managers 62, a storage medium group 63 including one or more service item groups 64 and one or more service item providers 65, a service routing manager 66 and a program manager 67. Each storage medium manager 62 may contain static data and/or dynamic data with respect to each SMU 20 under its control. The static data may comprise for example type, costs or recording capacity of each storing medium unit 20. The dynamic data may for example include status information such as whether or not the SMU is occupied by video and/or audio data and whether or not it is being in use, or whether or not it is malfunctioning.

The storage medium group 63 outputs a request for assignment of a SMU 20 to the storage medium manager 62 on basis of the requirements from the end devices 40. Such requirement can be specified by the statistical information, such as potential number of the end devices 40 that can request service in a certain time frame or length of video program. Other possible requirements may be whether or not any end device 40 has a possibility to select the more complex play mode such as mentioned above and including fast forward, fast reverse etc. The storage medium manager 62 proposes a suitable SMU 20 or suitable storage medium in the SMU 20 to a storage medium group 63 for the video service to the end device 40, according to static data and/or dynamic data with respect to each SMU 20 contained therein, e.g. table means, and the request from the storage medium group 63. Further, storage medium group 63 controls down-load operation of software programs to one of the end devices 40 in response to a request from this end device 40.

In case of a plurality of storage medium managers 62, each storage medium manager 62 may propose a suitable SMU 20 belonging to each storage medium manager 62 for the video service to the storage medium group 63. A storage medium manager 62 will ask another storage medium manager 62 to propose a suitable SMU 20, requested by the storage medium group 63, if said storage medium manager 62 can not satisfy the request of the storage medium group 63. More specifically, the service item providers 65 request assignment of one of the SMU 20 to the storage medium manager 62 via the service item group 65. The service item group 65 also control the down-load operation of control software programs originally provided from the program manager 67, which manages all control software programs to be used in the system and delivers each devices updated, suitable, and effective programs.

The service item group 65 can down-load a suitable down-loadable software program to the set top box according to the table therein representing relationship between service item identification and service item provider. When the request is provided from the service item provider, the service item group 65 can decide which down-loadable software is suitable for subsequent operation of the set top box according to the table in the service item group.

Even if the storage medium manager 62 is malfunctioning, the malfunctioning storage medium manager 62 may be restored while the SMU 20 outputs video and/or audio data, as reproduced video and/or audio data is directly output to the ATM switch 1 without routing by the storage medium manager 62.

Next, full VCR functions, for example fast forward, reverse, fast reverse and still play mode will be explained. In the full VCR function, an agile storage medium, for example a hard disc, is used. The agile storage medium is installed in one or more of the SMU's. At the beginning of the video on demand service, the video and/or audio data of the selected video program or video program with possibilities of VCR functions from end device 40, is copied from the archive SMU or a delivery SMU to this agile storage medium. The agile storage medium outputs video and/or audio data in the play mode required by a set top box 40 under control of the system manager 60. The system manager 60 provides for changing the virtual channel, if the full VCR function is requested by the end user, so that such end user is connected to an SMU with a hard disc enabling the full VCR function through the virtual channel. In the case, where an end device 40 is supplied with information from an MO-disc on which this information is recorded in a staggered fashion, and the end device for example request a fast forward or fast reverse play mode, a separate SMU containing an agile hard disc can be employed. This may be advantageous, when time will lapse between the request and the moment another virtual channel delivering this play mode becomes available. When the agile disc is employed intermediately, this agile hard disc can be engaged at a time pointer, corresponding to the time pointer of the virtual channel in use at the time of the request, can be speeded up or slowed down, and can consequently be disengaged, when the time pointer and speed of the agile disc correspond to that of another virtual channel delivering information in the selected play mode from an MO-disc containing information recorded in a forward or reverse staggered fashion.

When a set top box 40 requires simple VCR functions such as stepwise fast forward mode or stepwise fast reverse mode, these simple VCR functions can be performed by another delivery SMU 20. In this case, the delivery SMU which does not include an agile storage medium, for example outputs video and/or audio data recorded in a certain format which will be described hereinafter in a number of virtual channels through the ATM interface with respective time delays between the virtual channels. ATM switch 1 then provides the video and/or audio data in the required play mode to the set top box 40 by changing the relationship between input virtual channels and output virtual channels under control by the system manager 60.

Some examples of communications established between the end devices 40, the system manager 60 and the SMU's 20 by using the table data shown in FIG. 11 will be explained hereafter. If the end device 40 (STB-2) requests a selected movie by calling the identification number 678901 corresponding to the movie and provided from one of the navigation devices 30 at time 0:09, one of the service item providers 64 (SIP-1) is designated by the identification number.

The service item provider 64 (SIP-1) then checks the present time and obtains from the table therein the next available time point 0:10 as the starting time of the movie, distribution control data including the number "2" designating the SMU 20 storing the video and/or audio data if the movie and the number "2" designating one of the service item streams (SIS) from the SMU 20 making the movie available from the beginning at the time point 0:10, and the virtual channel number "21" for this stream, and supplies the SMU 20 designated by the end number "2" with the SIS number "2", virtual channel number "21" and the end device number "STB-2".

The service item provider 64 (SIP-1) up-dates the conversion table in the ATM switch 1 according to another table data available in the service item provider 64 (SIP-1) so that the relationship between input virtual channel number "21", for the service item stream (SIS) and the output virtual channel number "21" for the end device 40 (STB-2) is established. Therefore, the data stream of the requested movie is provided to the end device 40 (STB-2) from the beginning at time 0:10.

If the end device 40 (STB-2) requests one of the service item providers 64 (SIP-1) for full VCR function, the service item provider 64 (SIP-1) obtains from the table therein distribution control data including the number "4" designating the SMU 20 having full VCR function capability and the number "1" designating one of the service item streams (SIS) from the SMU 20 designated by the number "4" with the SIS number "1", virtual channel number "28" and the end device number "STB-1".

The service item provider 64 (SIP-1) up-dates the conversion table in the ATM switch 1 according to another table data available in the service item provider 64 (SIP-1) so that the relationship between input virtual channel number "28" for the service item stream (SIS) and the output virtual channel "7" for the end device 40 (STB-1) is established. Therefore, the data stream of the requested movie is provided to the end device 40 (STB-1) with full VCR function.

Such an interactive communication system as outlined above is suitable to be used as a platform for a plurality of server-owners, navigation device owners, system manager owners and users simultaneously, where one party can for example exploit one or several SMU's 20, as well as a system manager 60 and/or one or several navigation devices 30.

In FIG. 1 the entire system is configured around a single ATM switch 1. Application of more than one private ATM switch and/or public ATM network is equally possible. Furthermore, another type of transmission network can be used. The network with one or more ATM switches, however, is considered to be the most suitable network configuration for the applications envisaged.

Next, details of each device will be explained.

Figure 2:
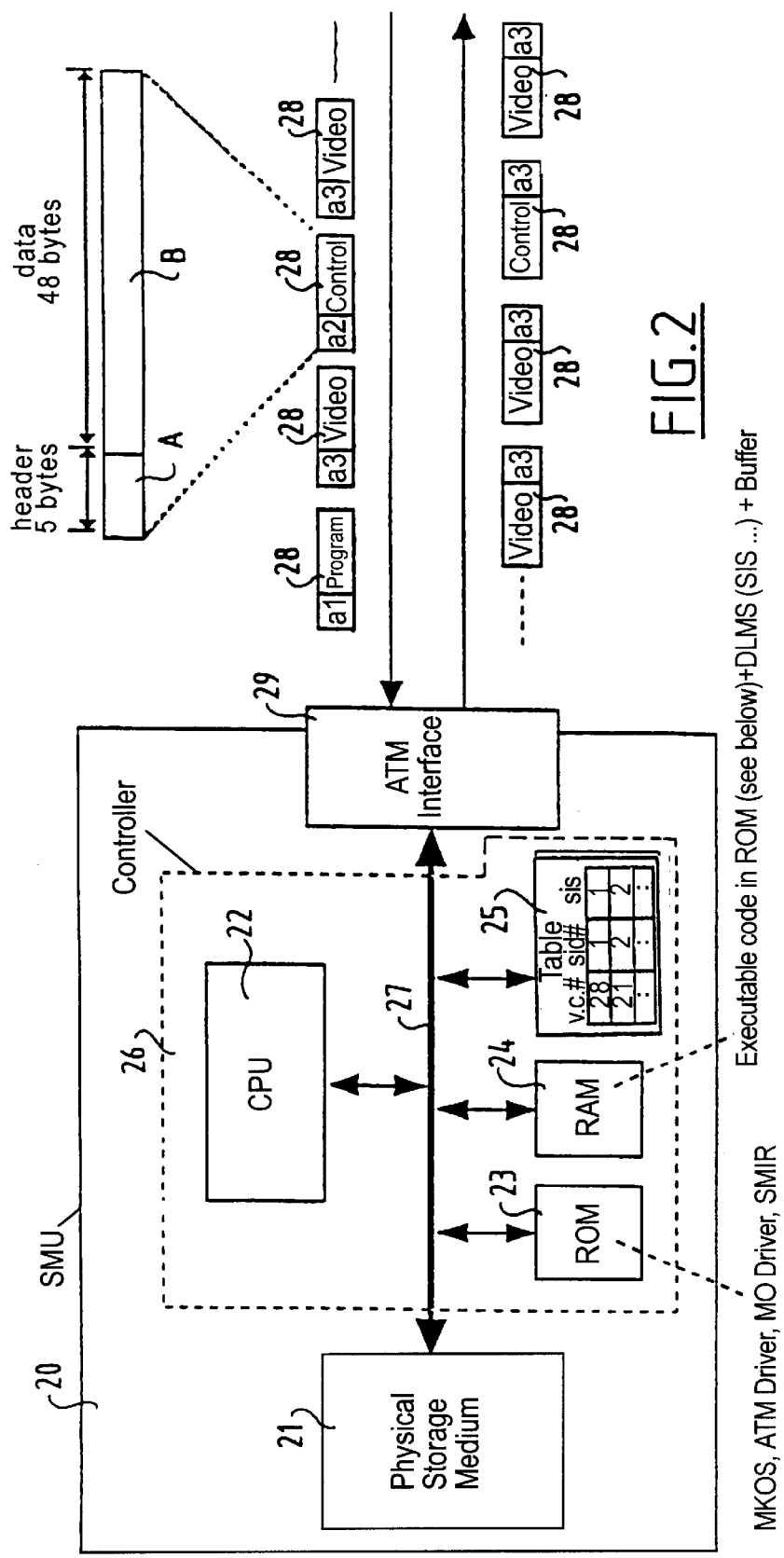
FIG. 2 is a representation of a first embodiment of a storage medium unit.

FIG. 2 shows a configuration of a SMU 20. Each SMU 20 contains a physical storage medium 21, for example an Magneto Optical (MO) disc and a corresponding driver or one or more hard discs and the corresponding drivers thereof, an ATM interface 29 as part of the SMU 20 or located outside such unit 20, a memory 25, for example for storing a table, and a controller 26 formed by a CPU 22, a RAM 24, a ROM 23, and a bus 27.

CPU 22 of controller 26 controls the storage medium 21 and other operations of the SMU 20 according to software programs stored in ROM 23 and an additional control software program downloaded into RAM 24 and table data stored in this memory of the SMU 20.

The physical storage medium 21 primary contains service items, but can also contain control software program to be down-loaded to the end device 40 or one or more of the SMU's 20 when required.

ROM 23 of the SMU 20 preferably contains a microkernel operating system and a storage medium interface resident software such as an ATM drive, an MO disc driver. The microkernel operating system functions as a basic set of instructions, capable only of the most elementary of communication operations, e.g. down-load of control software specifically tailored for subsequent communications to be performed by the SMU 20. The ATM driver is used for establishing communications through the ATM interface 29. The MO disc driver is responsible for the mode in which the physical storage medium 21 functions which will be described hereinafter. The controller 26 also contains a table 25, in which relationships between virtual channels and end devices 40 are established.

The ATM interface 29 may communicate with the ATM switch 1 in a full duplex mode, where the ATM interface 29 can simultaneously handle incoming and outgoing ATM packets 28. In FIG. 2 such an ATM packet 20 is shown to contain a header portion A, usually comprising five bytes, and an information field portion B, usually comprising forty-eight bytes.

RAM 24 contains executable code in ROM 23, a downloadable module for optimum functionality as a server, and a buffer.

Figure 3:
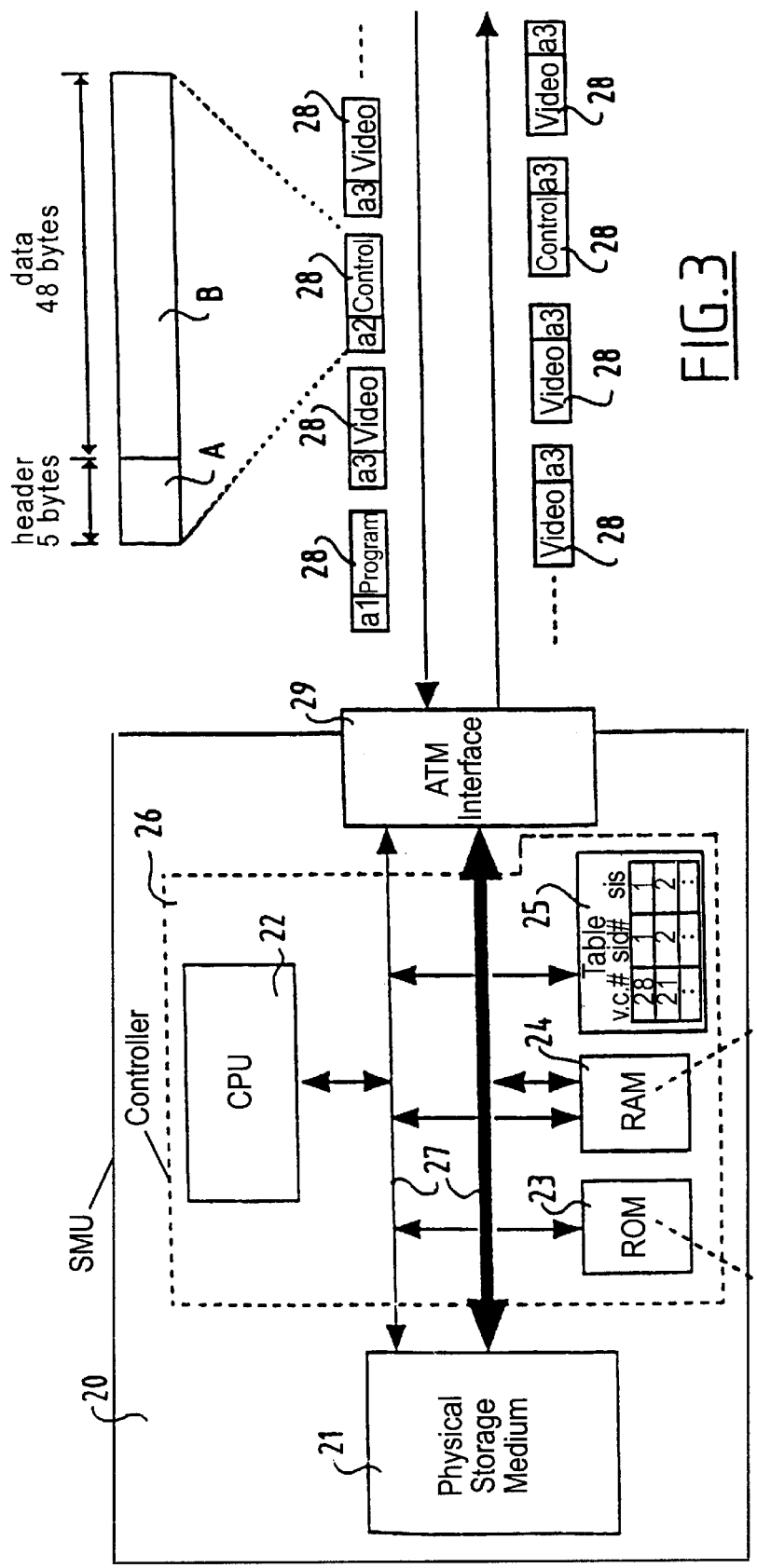
FIG. 3 is a representation of a second embodiment of a storage medium unit.

FIG. 3 shows a SMU 20, where bus 27 is divided into a separate control bus and a separate data bus to provide a high throughput.

Figure 4:
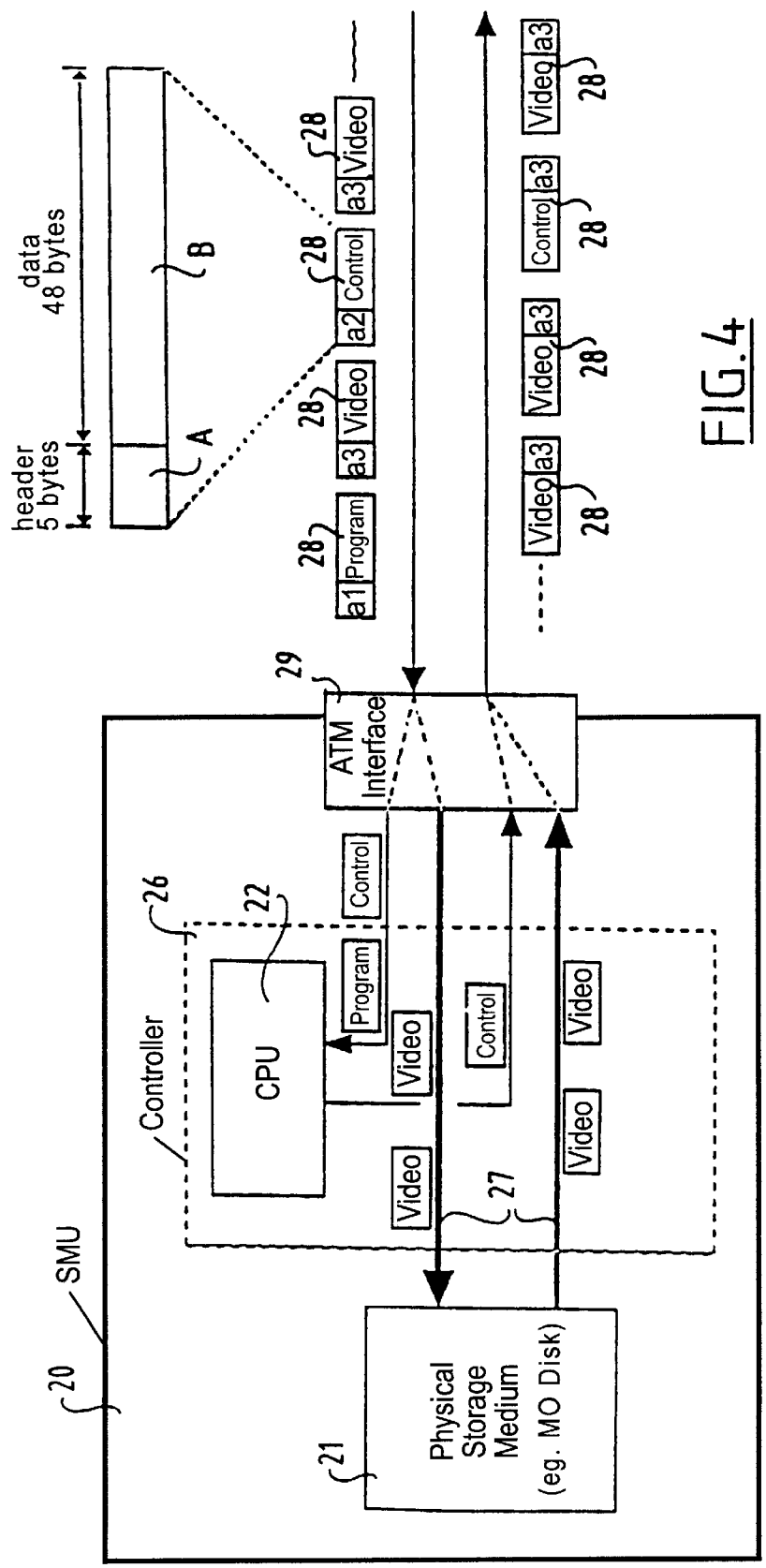
FIG. 4 is a schematic representation of control and data flow in the storage medium unit shown in FIGS. 2 and 3.

FIG. 4 shows a schematic representation of control and data flow in the SMU 20 shown in FIG. 3. Here distinction is made between incoming and outgoing video and/or audio data and incoming and outgoing control data and incoming control software program to be down-loaded. Respective packets of video and/or audio data, control data and software program, even if these packets ate transferred to same SMU 20 or same end device 40, should have different routing information in the header to be distinguishable from each other.

Figure 5:
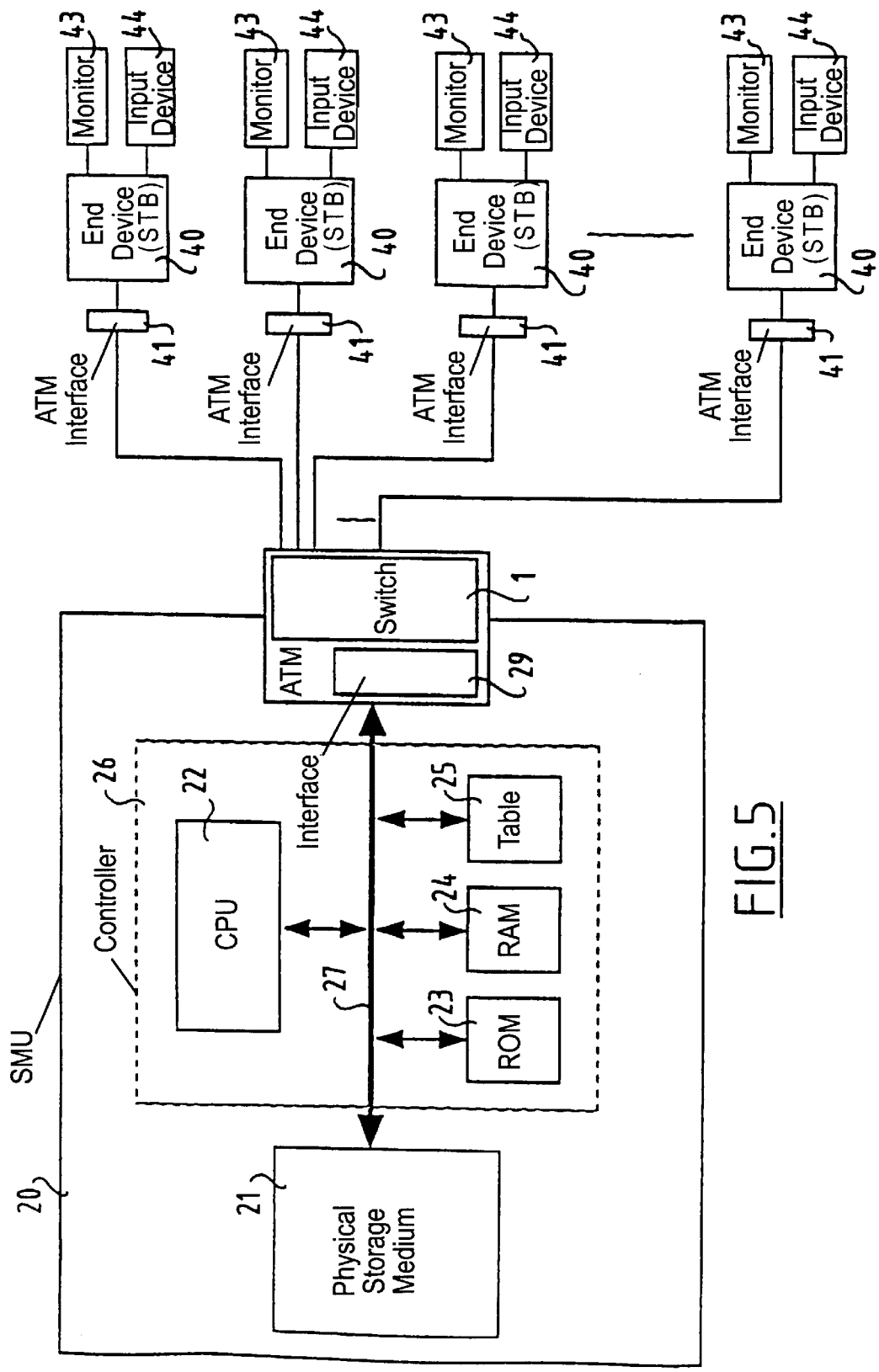
FIG. 5 is a representation of a third embodiment of a storage medium unit.

FIG. 5 shows a third embodiment of the SMU 20, where an ATM switch 1 and the ATM interface 29 of the SMU 20 are incorporated. As a result connections can be established from the SMU 20 directly through ATM interfaces 41 to the end devices 40. In this case, the system manager 60 may be connected to the ATM switch 1 or the controller 26 may replace the function of the system manager 60.

Figure 6:
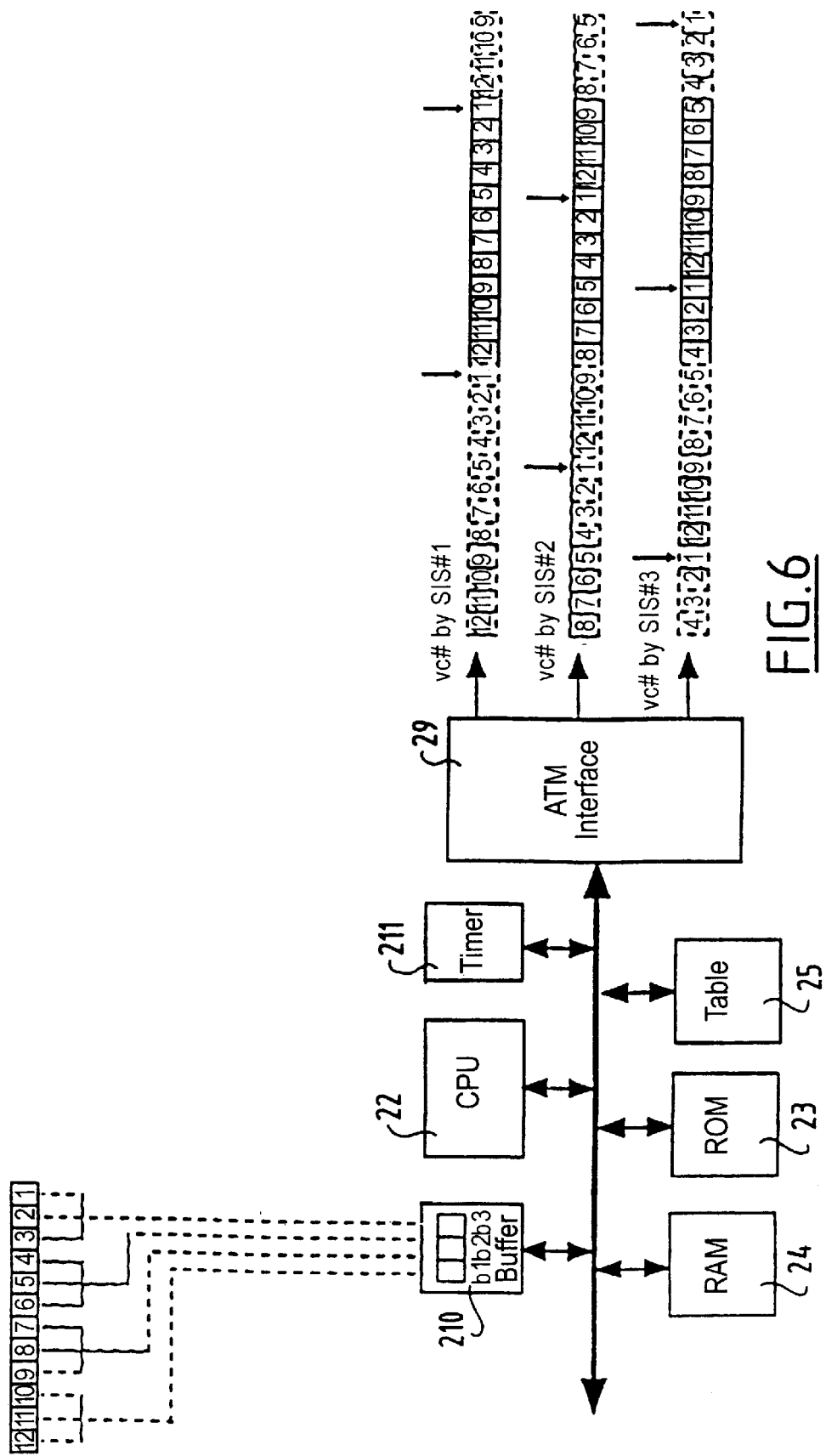
FIG. 6 is a representation of a storage medium unit corresponding to the storage medium unit shown in FIG. 2, with a resulting flow of data groups.

FIG. 6 shows a SMU 20 corresponding to the embodiment of FIG. 2, where the method for reading and outputting data segments from a physical storage medium, e.g. a disc is shown. As an example data groups are output via three virtual channels, which channels could also be formed by separate physical channels. In this figure the principle of reproducing staggered recording data, which will be further described hereinafter, is shown. The SMU 20 shown here contains a buffer 210 and a timer 211, where the buffer 210 is preferably a part of the ATM interface 29. The video data is divided in a predetermined number T of sentences, where T corresponds to the number of channels and equals three in case of FIG. 6. Each sentence is divided in a predetermined number N of data groups and N equals four in case of FIG. 6. The video data are recorded in the storage medium 21 after the order of the data groups is changed in such a way that n-th (where n=1, 2, 3, 4 . . . N) data group of the first sentence is followed by n-th data group of the Tth, T-1th, . . . , and T-(T-2)th sentences sequentially, as n is sequentially increased, as shown in the upper left side of FIG. 6.

The video data recorded in the above manner is sequentially and cyclically reproduced from the storage medium 21. The n-th data groups of the respective T sentences are sequentially stored in the buffer 210 and output to respective different virtual channels through the ATM interface 29. After respective N data groups of T sentences are output, the virtual channels are switched over in the next and following cycles as shown in FIG. 7, so that N×T data groups are continuously reproduced via each virtual channel with a time difference of one sentence from each other as shown in the right hand side of FIG. 6.

Figure 8:
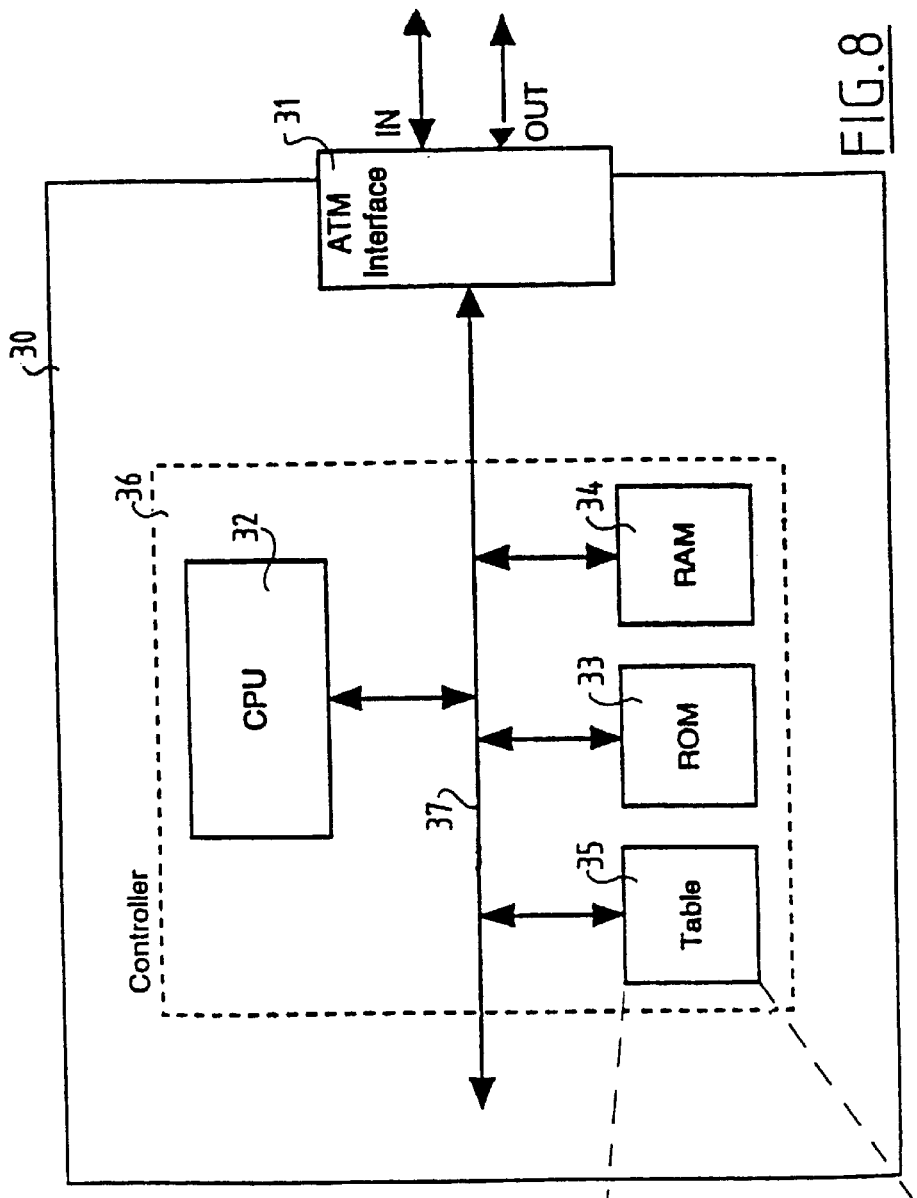
FIG. 8 is a representation of an embodiment of the navigation system shown in FIG. 1.

FIG. 8 shows a configuration of a navigation device 30. Navigation device 30 preferably comprises: a controller 36, formed by a CPU 32, a ROM 33, a RAM 34 also for navigation software programs to be down-loaded to the end devices 40 and a bus 37; a table 35 for available video programs and identification data, for example a public address of available video programs, and also an ATM interface 31. The controller 36 controls operation of the navigation device 30 according to programs stored in ROM 33 and RAM 34. The navigation device 30 down-loads navigation software programs to the set top box 40, when the set top box 40 requires a navigation operation to the navigation device 30. The navigation device 30 then provides information relating to available video programs and identification data thereof to the set top box 40. Public addresses can be used when a public network is used in the interactive communication system. Many kinds and versions of the navigation menu can be provided, if the interactive communication system has a plurality of navigation devices 30, which handle for example a Japanese version, an English version, three dimensional graphical version etc.

Figure 9:
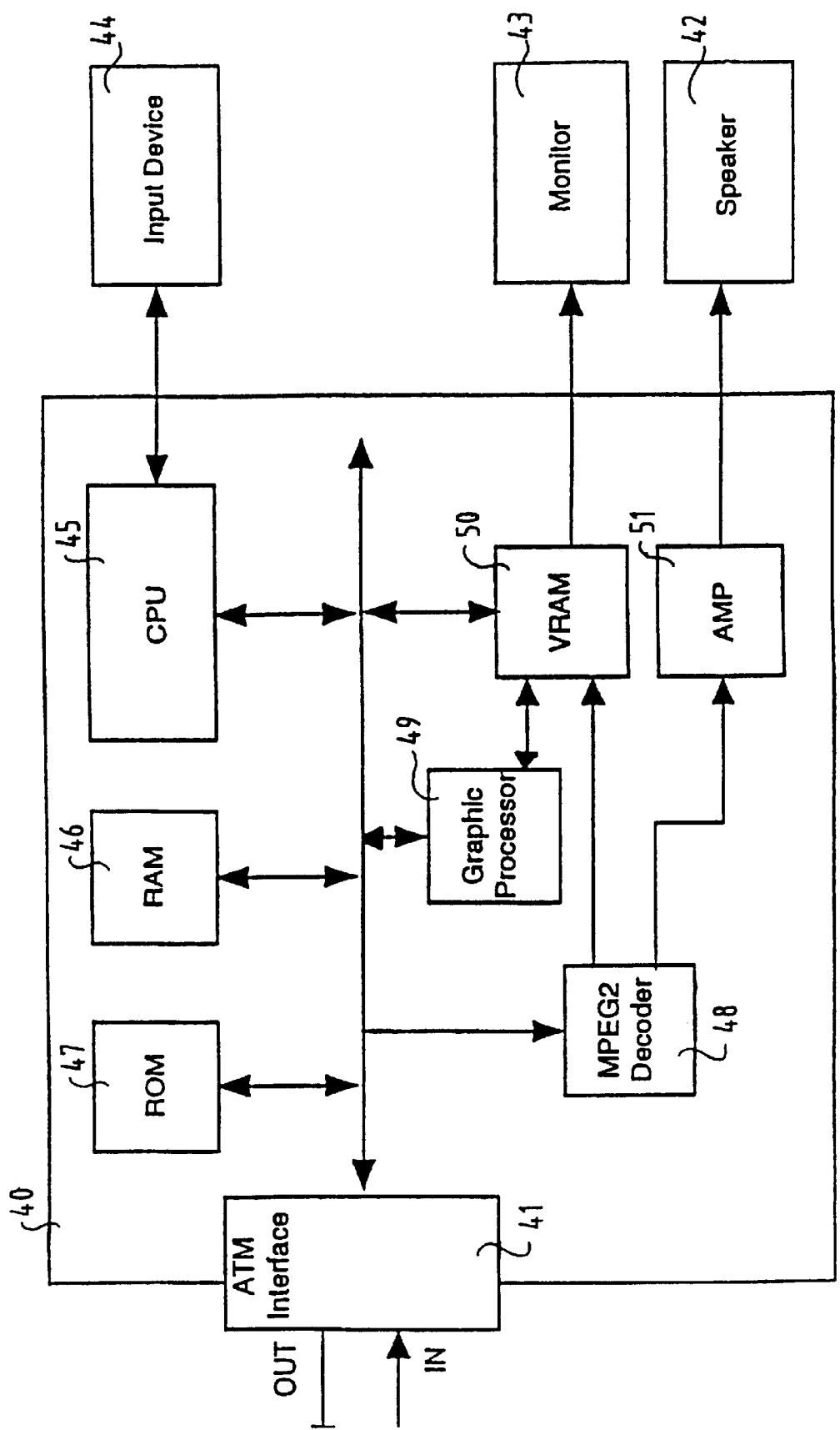
FIG. 9 is a representation of an embodiment of the end user device shown in FIG. 1.

FIG. 9 shows the configuration of an end device, here a set top box 40. The set top box 40 may comprise a CPU 45, a RAM 46, a ROM 47 and an MPEG decoder 48. CPU 45 controls operation of the set top box 40 according to programs stored in ROM 47 and RAM 46. Said programs may be down-loaded from the system manager 60, a SMU 20 or a navigation device 30. The MPEG decoder 48 decodes compressed video data and/or audio data, supplied via the ATM switch 1 and supplies video data, if necessary combined with data from a graphic processor 49 through a video RAM memory 50 to the monitor 43 and supplies audio data via an amplifier 51 to the speaker system 42. The CPU 45 produces demand data according to instruction data input through the keyboard 44 or a similar device by the user. Such demand data is output via the ATM interface 41.

Figure 10:
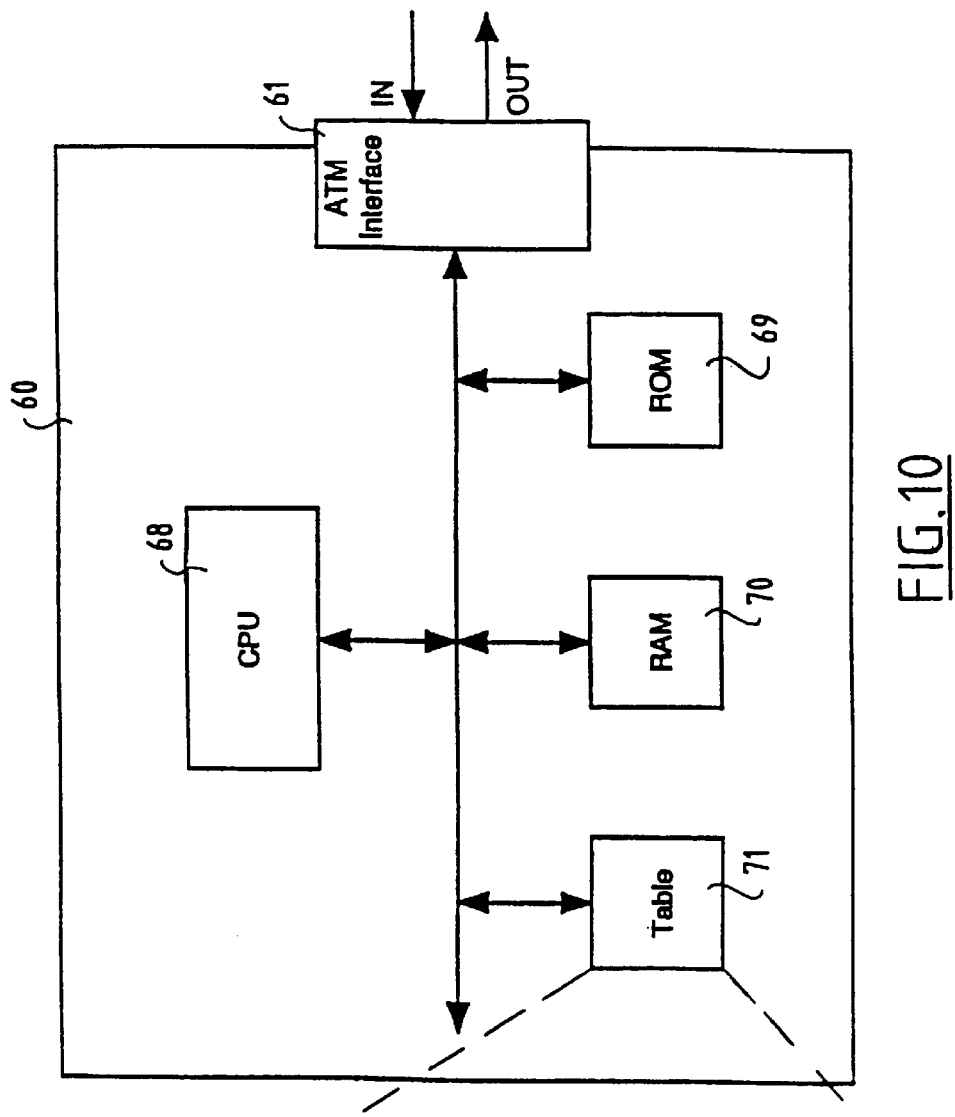
FIG. 10 is a representation of an embodiment of the system manager shown in FIG. 1.

FIG. 10 shows a configuration of the system manager 60. The system manager 60 contains a CPU 68, a ROM 69, a RAM 70, and here a memory for various VOD software programs to be down-loaded to the set top boxes 40 and/or the SMU's 20, an ATM interface 61 and memory 71, e.g. in the form of table means. The CPU 68 controls operation of the system manager 60. The system manager 60 provides operation software to SMU's 20 and set top boxes 40 and updates tables for data representing a relationship between input virtual channels and output virtual channels in the ATM switch 1. Such a system manager 60 can perform all functions described above relating to the storage medium manager 62, the program manager 67, the service item providers 64, the service item group 65 and the server routing manager 66.

Figure 11:
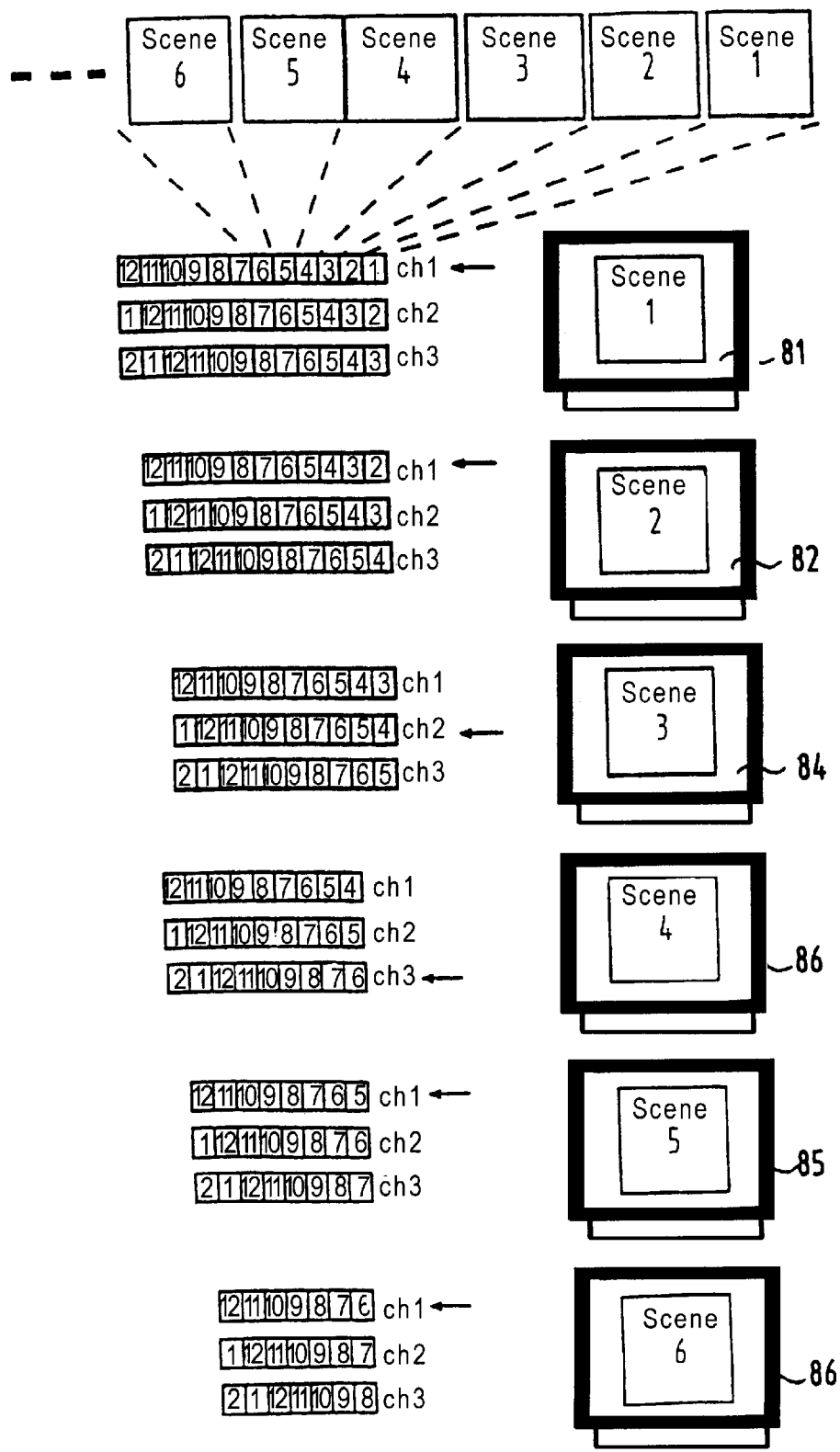
FIG. 11 is a diagram showing basic reproducing functions with staggered recording.

FIG. 11 shows a sequence of scenes, where said sequence can be accomplished by displaying video data on various transmission channels. In this example twelve (virtual) transmission channels are employed as T=12, though from channels 4 to 12 are omitted from the drawing for simplification. Data groups are reproduced from a physical storage medium 21 containing the staggered recording data and output via these virtual channels in a similar manner to FIGS. 6 and 7. As shown in FIG. 11, the sequence of scenes can be altered by switching from channel to channel for input of video data comprising such a scene so that a simple VCR function can be realized. For example, by switching from channel 1 to channel 2 while the scene '2' is displayed, the scene '4' can be displayed, thereby skipping scene '3' as fast forward mode. Similarly, by switching from channel 3 to channel 1 while the scene '6' is displayed, the scene '5' will next be displayed thereby creating a reverse mode. Such switching between virtual channels can be done by updating the conversion table of the ATM switch 1 under control of the system manager 60 according to the control data from the end device 40. When switching between channels is not performed, the natural sequence of scenes will be followed, as this is the sequence in which video data occurs on a single channel.

Scene 5 appeared after scene 6 by switching from channel 3 to channel 1. Thus reverse skip play is performed.

Figure 12:
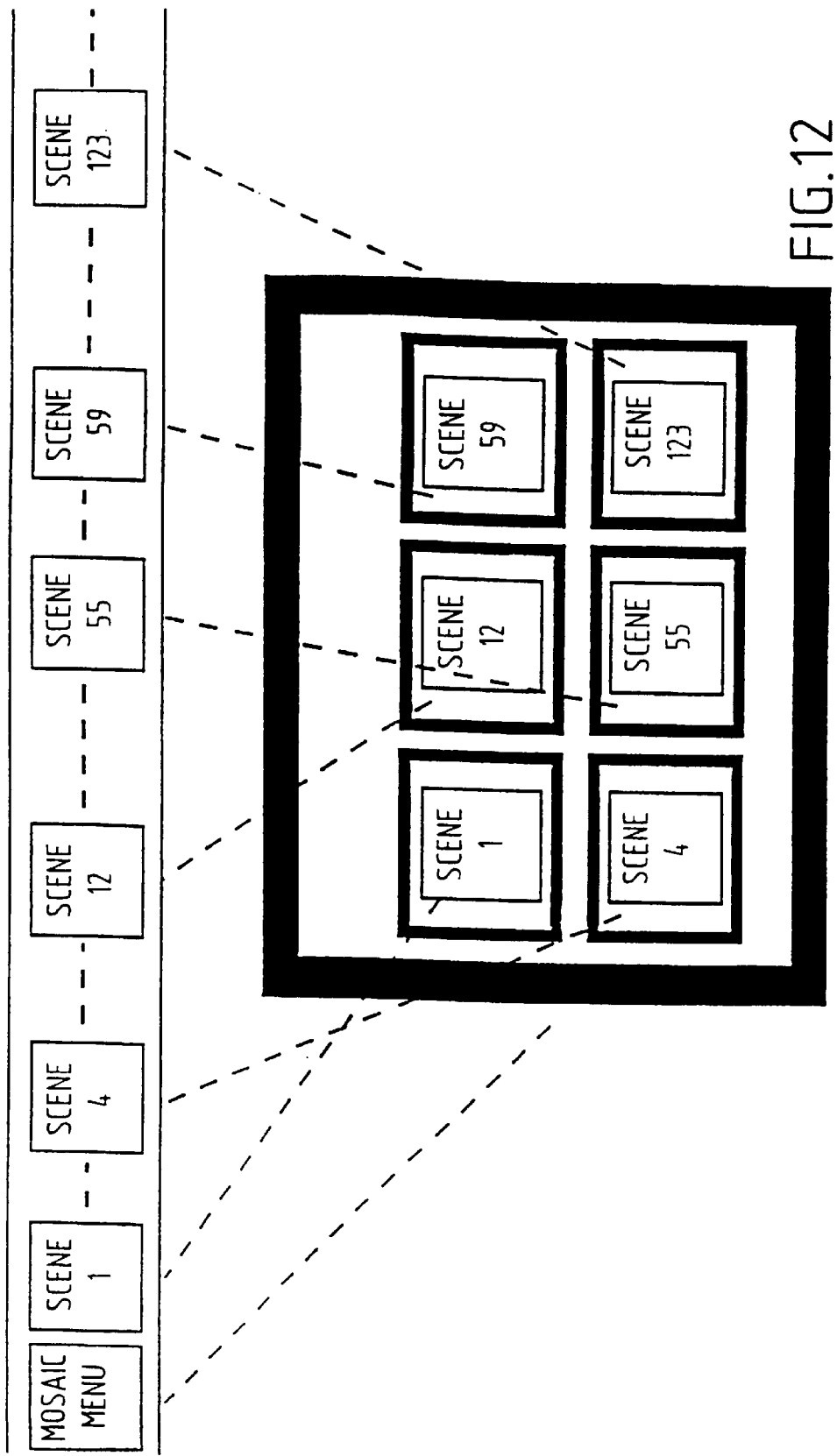
FIG. 12 is a diagram showing a mosaic menu function.

FIG. 12 shows an example of a mosaic function to be performed by an end device 40, whereby selected scenes taken from a sequence are displayed on monitor 43. A user can in this way select a starting point, other than the beginning of a film, by issuing a corresponding demand through the input device 44. Such a mosaic function can of course also be used for visualizing a menu of service items selectable through one or several navigation devices 3, e.g. title frames of several selectable video programs, where such selected scenes for mosaic function can be displayed by switching the virtual channels on a real time basis and storing these into the video RAM 50 simultaneously or by reproducing the video data previously stored in the SMU 20 as mosaic video data. Next, recording formats of video data on a physical storage medium 21 will be explained, referring to FIGS. 13–15.

Figure 13:
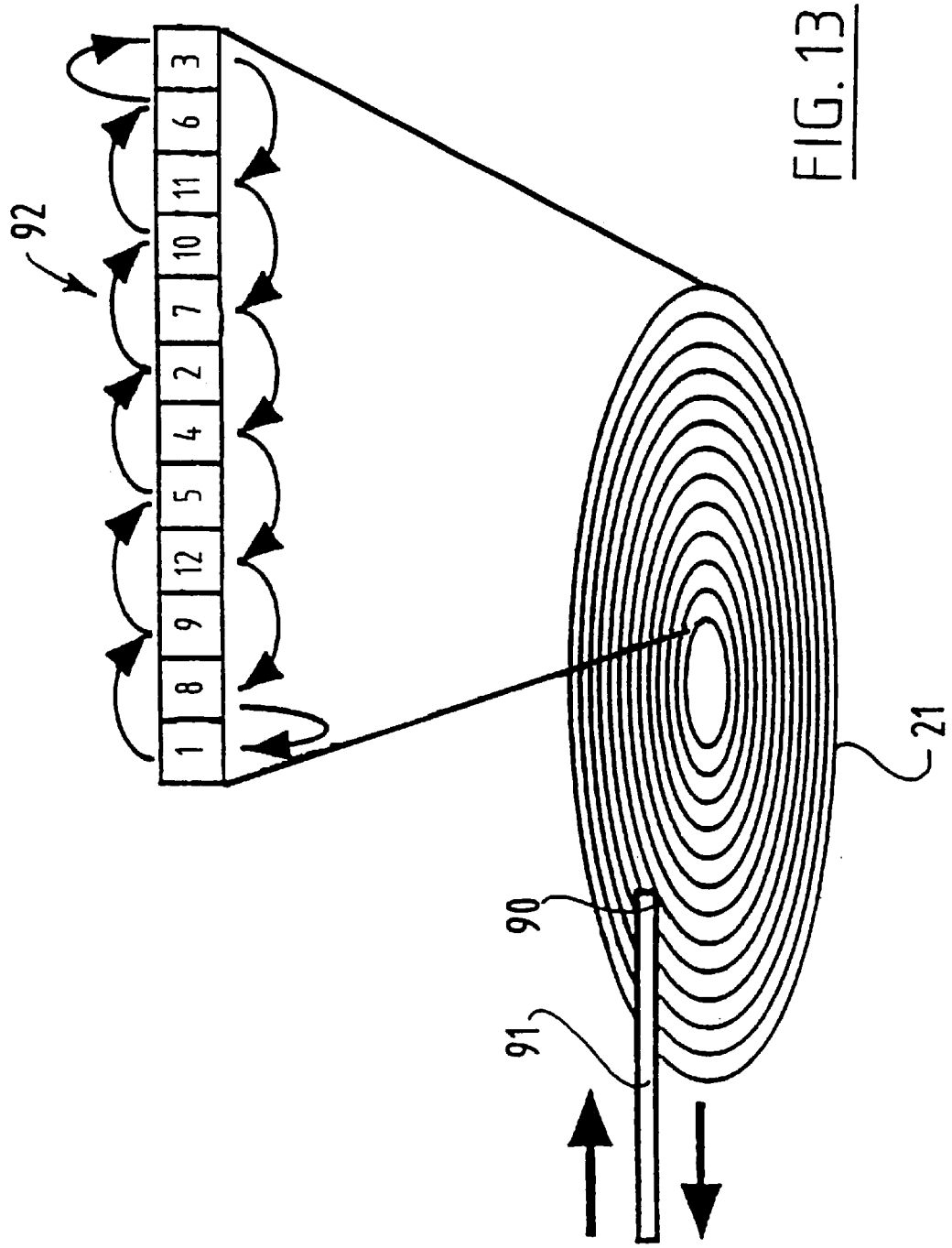
FIGS. 13, 14 and 14A show respective record formats of record tracks on a MO disc.

In FIG. 13 a physical storage medium 21 is shown, where a head 90 is attached to an arm 91, movable to and from the center of the physical storage medium 21. Here, the physical storage medium 21 is formed by a MO disc. Data tracks of the MO disc 21 contain data groups in the staggered recording sequence 92 shown in this FIG. 13 above the physical storage medium 21. The arrows above and beneath this representation of sequence 92 denote the order, in which head 90 reads the data groups from the physical storage medium 21. As shown here, reproducing head 90 skips data groups on the outbound pass over the physical storage medium 21, where the skipped data groups are read during the inbound pass over the physical storage medium 21. In this way no time loss occurs between the end and start of a sequence of data groups, to be sent to the controller 26 of the SMU 20 (see FIG. 6) and a continuous flow of data groups in the order, required by the controller 26 of the SMU 20 is ensured. Because of the continuous flow of data groups a buffer memory of only a small size is required.

Video data, which is to be recorded in a storage medium with a format described above, is reproduced from said storage medium 21, and output from the SMU 20 to the ATM switch 1 through the ATM interface 29 as three virtual channels.

Figure 14:
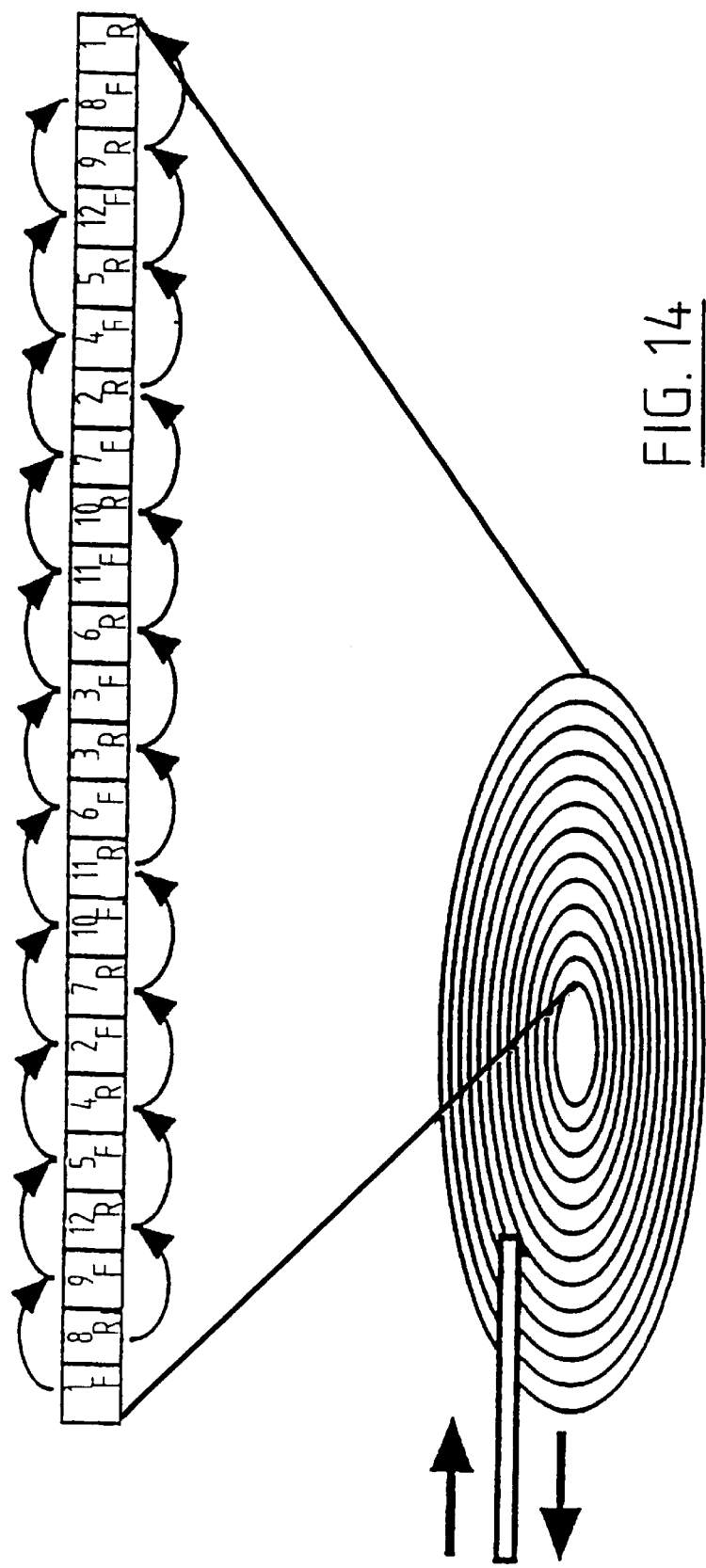

In FIG. 14 first and second video data with the same content but opposite time lines are recorded on the disc. In this case the data groups of the first video data and the data groups of the second video data are interleaved. The first video data is used, when the set top box requires normal forward, fast forward, or stepwise fast forward play mode. On the other hand, second video data is used when the set top box requires reverse play mode. Furthermore it is possible for the data groups of the first video data to be recorded on every other track of the disc. The data groups of the second video data are stored in remaining tracks of the disc. Then the recorded first video data is reproduced from every other track of the disc by moving a reproducing head in a first direction. Recorded second video data is reproduced from the remaining tracks of the disc by moving the reproducing head in this first direction. It is also possible to reproduce the second video data in the reverse if the first direction after the first video data are reproduced so that similar effects to the recording format shown in FIG. 13 is obtained.

Figure 14A:
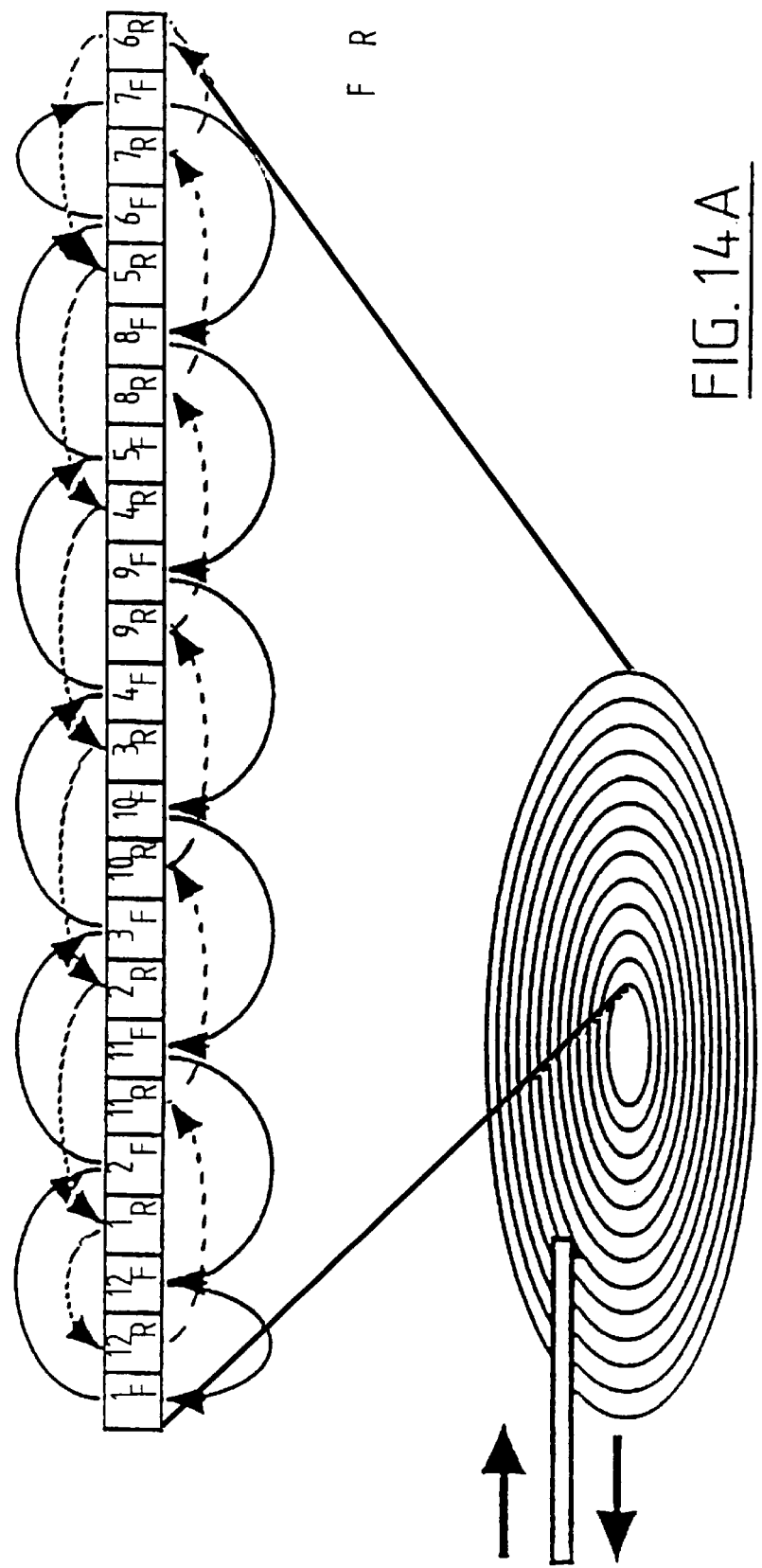

In the first and second video data are encoded in accordance with MPEG standard, the second video data should be encoded in the reverse manner of the first video data. In such a case, it may not be possible to reproduce the second video data in the reverse direction as explained above. In the example of FIG. 14A also the distance of head movement is minimized, both for forward and reverse play, as the forward data groups (1F, 2F, 3F, 4F etc.) are recorded in every fourth track in a similar manner to FIG. 13, while the reverse data groups (12R, 11R, 10R, 9R, etc.) are recorded before 2F, 3F, 4F etc. respectively, also in every fourth track. Also the distance of the head movement is minimized at the edges of the disc as will become clear from the sequences of 6F, 7F and 8F and 7R, 6R and 5R at the inside edge, and 12F, 1F and 2F, and 1R, 12R and 11R, respectively.

Figure 15:
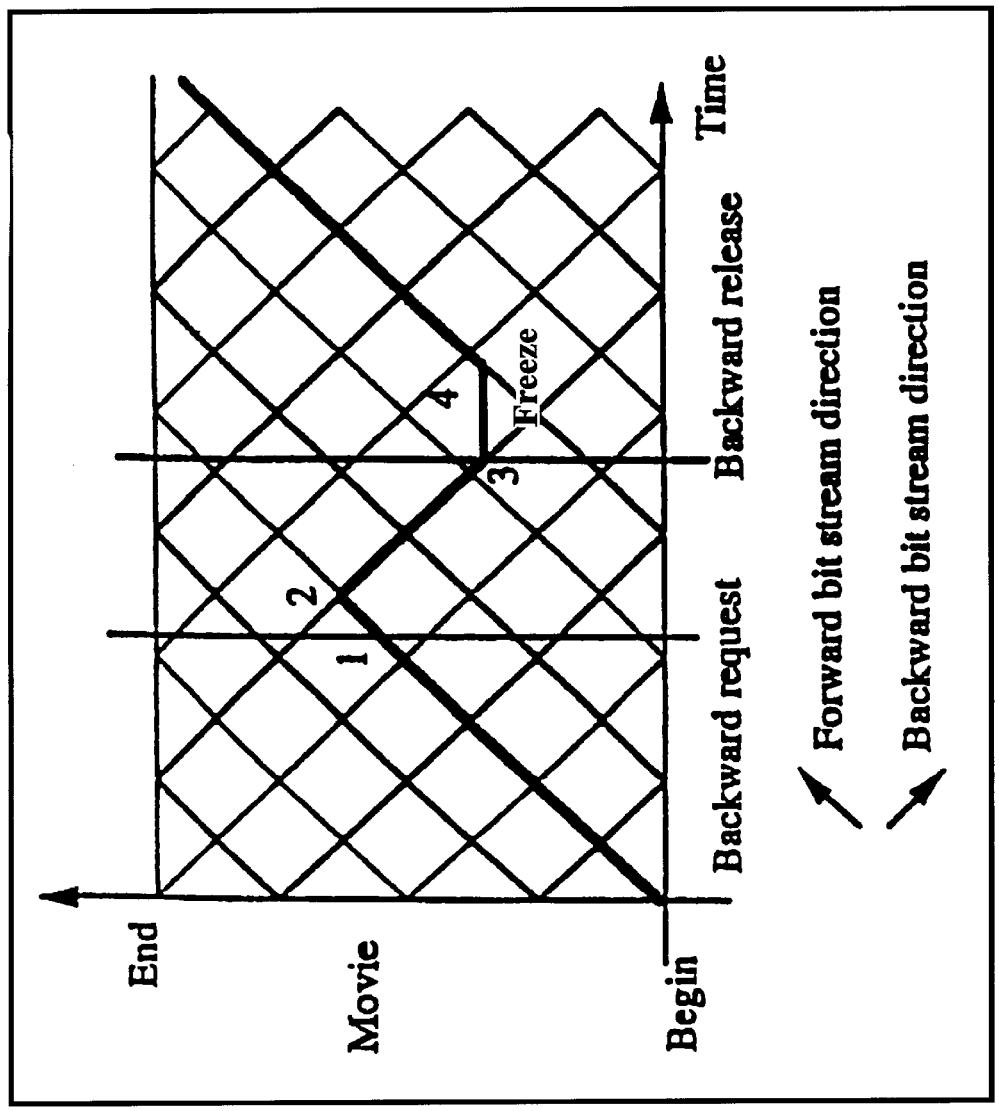
FIG. 15 shows a representation of reproduction of data recorded in a staggered format according to FIG. 14.

FIG. 15 shows a diagram of a sequence of video data displayed on a monitor, where the sequence is obtained by using the recording format and reading sequence shown in FIG. 14, and by receiving from and sending to different virtual channels, respectively in order to obtain forward and/or reverse play modes, for which purpose data are recorded in the staggered fashion, described referring to FIGS. 13, 14 and 14A as examples.

Figure 16:
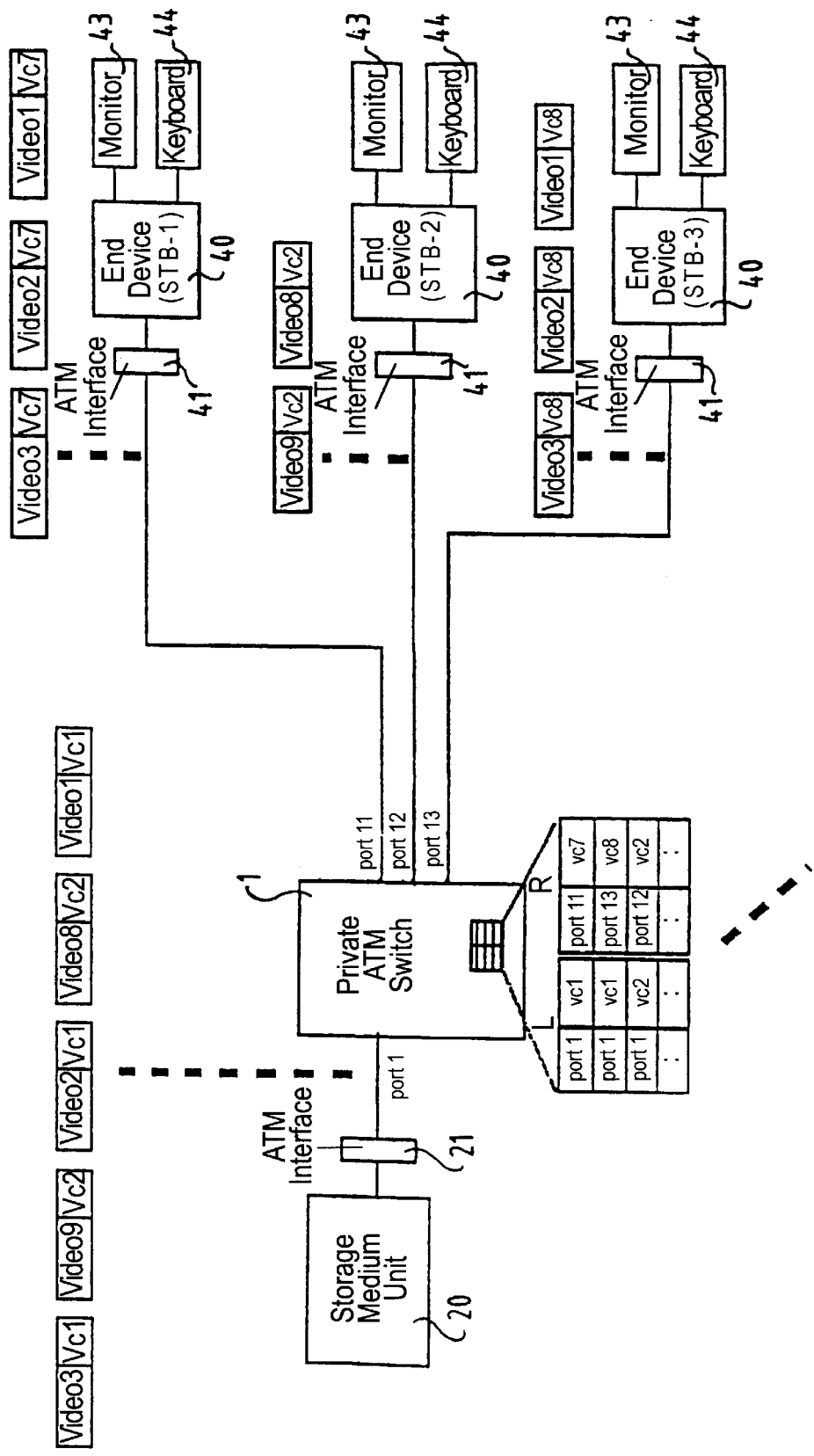
FIG. 16 shows an example of multicasting.

Multi-cast functions will be explained, referring to FIG. 16. In the multi-cast function the system manager 60 as shown in FIG. 1 also manages distribution of video data. If the system manager 60 receives a demand data from one or more of the end devices 40, even in the course of service, asking to provide a same video and/or audio data as transmitted from one of SMU 20 to or requested from other end devices 40, the system manager 60 outputs to the ATM switch 1 distribution control data including information of the input virtual channel of the selected video data from the SMU 20 and the output virtual channel of the end device 40 requesting the video and/or audio data which are generated in response to the received demand data. For example, if an end device STB-3 requests same video data "video 1", "video 2", and "video3" as requested by and transmitted to another end device STB-1 from the SMU 20 through an input virtual channel "vc 1" and an output virtual channel "vc7", the system manager 60 outputs the updated conversion table to the ATM switch 1, so that the header of the ATM packets transmitting "video 1", "video 2" and "video 3" are replaced in the ATM switch 1 with not only the header corresponding to an output virtual channel "vc7" but also the header corresponding an output virtual channel "vc8" designated by the end device STB-3. Therefore, the ATM packets containing "video 1", "video 2" and "video 3" are supplied to both of the end devices 40 STB-1 and STB-3 simultaneously.

Figure 17:
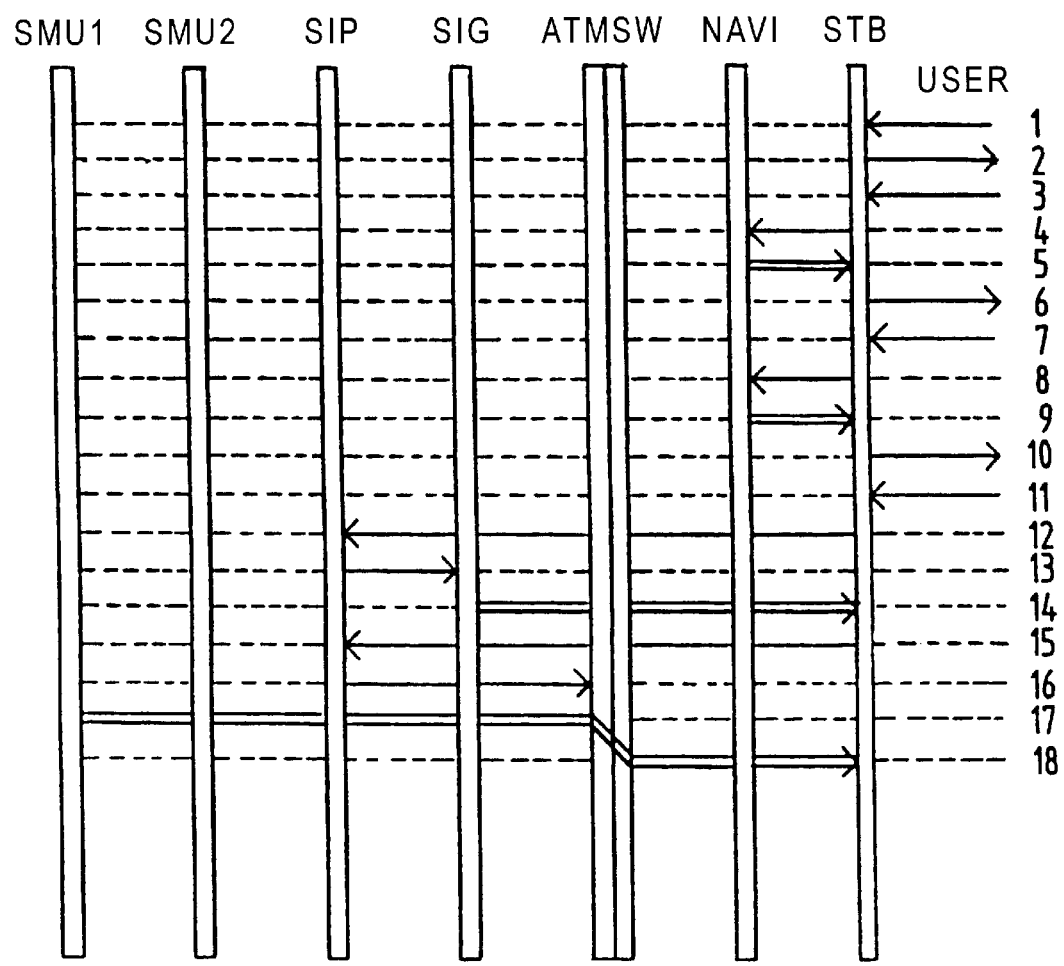
FIG. 17 is a diagram of an example of a sequence of communication steps in a system according to the present invention.

The sequence of communication, shown in FIG. 17, represents a method in which flow of video data from a SMU 20 to a set top box 40 is established. First, in step 1, a user informs a set top box 40, denoted by STB, through his input device 44, that he wishes to gain access to the system. The set top box 40 replies by asking the user in step 2 what kind of service, like video-on-demand, games or just television, the user wishes to select. Such selectable options may be stored in memory of the set top box 40. Next, in step 3, the user enters his choice through his input device 44 to the set top box 40, which then involves the navigation device 30, in this figure denoted by Navi. Description below will relate to the case, where the user has selected a video-on-demand service menu, for which one or several navigation devices 30 are suitable. Nevertheless, only one navigation device 30 is represented in this figure for clarity.

In step 5 navigation device 30 provides set top box 40 with a menu of selectable video services, to which the navigation device 30 can gain access. In said menu options can also be included, referring the set top box 40 to another navigation device 30, which can gain access to other video services. In the next step 6 set top box 40 passes the menu on to the user by display thereof on monitor 43. In step 7 the user enters his choice through his input device 44, which in this case is a request for a further menu. This request is relayed to navigation device 30 in step 8, whereupon navigation device 30 supplies a new menu of selections to set top box 40 in step 9. Steps 7–10 can be repeated a number of times, until, as is the case in step 10, a menu displayed on monitor 43 by set top box 40 contains an option for a video program the user wishes to select, which is represented by step 11. Set top box 40 in step 12 requests service item provider 64, denoted by SIP, to provide for a video stream to a top set box with a given public address, corresponding to the address of the service item provider 64. In step 13 service item provider 64 first request service item group 65, denoted by SIG, to provide set top box 40 with control data necessary for optimum handling by the set top box 40 of the video stream to be established, which control software is down-loaded into the set top box 40 in step 14. Now, set top box 40 is capable of issuing commands relating to VCR functions, where in step 15 the first play command is issued to the service item provider 64. In step 16 service item provider 64 locates the first available video stream for the request, which in this case originates from storage medium unit 40, denoted here by SMU1, and sets ATM switch 1, denoted by ATM SW to connect said storage medium unit 20 and set top box 40 by re-writing the virtual channel table in the ATM switch 1. In steps 17 and 18 the requested video stream is routed through ATM switch 1 to set top box 40, where the requested video program can now be displayed on monitor 43.

Figure 18:
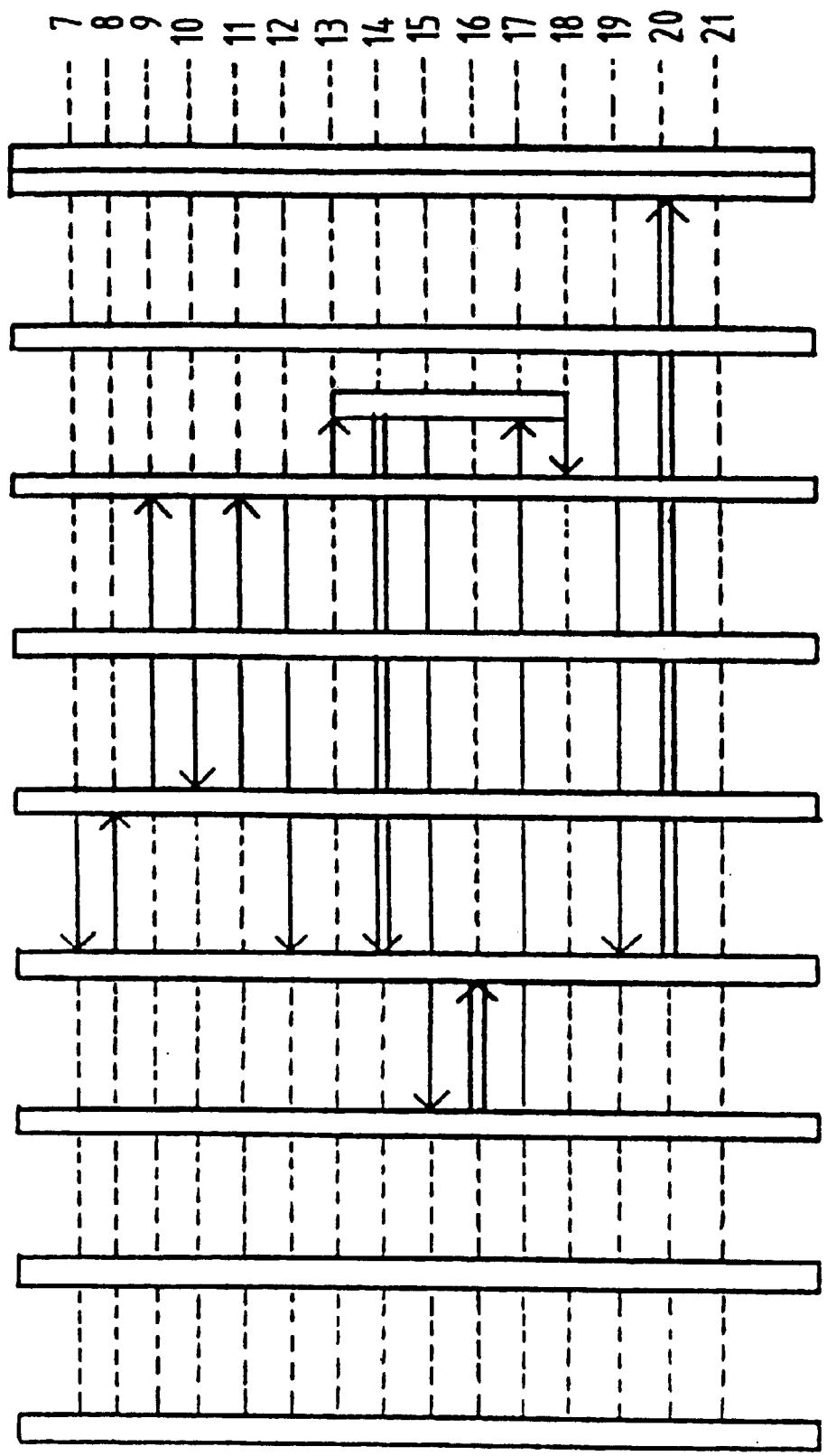
FIG. 18 is a diagram of another example of a sequence of communication steps in a preferred embodiment of the system according to the present invention.

In FIG. 18 dynamic reconfiguration of the system is clarified. In this timing chart on line 13 the service items group (SIG) creates a new instance of a SMU installer and provides the number of the source SMU, of the destination SMU and other parameters. In line 14 the SMU installer executes a download operation to SMU1 as destination and leaves SMU1 waiting for data. In line 15 the SMU installer requests SMU2 as source to start providing data to SMU1 as destination. In line 16 the requested data is transferred from SMU2 to SMU1. In line 17 SMU2 reports to the SMU installer that the data transfer is completed. In line 18 the SMU installer informs the SIG that SMU1 is ready to serve data, whereafter the SMU installer disappears. In line b19 the SIG requests SMU1 to start serving data to a certain virtual channel, so that such data can be served to end users.

In the foregoing description a number of characteristics and details have been described with reference to preferred embodiments. It should however be understood that the present invention is not limited to the above description of such preferred embodiment. The requested rights are defined by the following claims.

What is claimed is:

1. A system for serving information data over one or more channels to one or more end user devices, comprising:

a plurality of storage medium units for storing information data, wherein said plurality of storage medium units include an archive storage medium unit which contains said information data and a plurality of delivery storage medium units that stores said information data from said archive storage medium unit as needed;

managing means for managing distribution of the information data to any one of the end user devices, wherein the managing means receives demand data relating to information data selected through at least one respective end user device, and wherein the managing means outputs distribution control data including channel information of the selected information data and routing information for said at least one end user device; and routing means for connecting the one or more delivery storage medium units to the at least one end user device, and for routing the selected information data from the delivery storage medium units and the distribution control data from the managing means, wherein the managing means manages the distribution of the information data from one or more of said delivery storage medium units to an appropriate one or more of the end user device(s) in accordance with a predetermined number representing a number of said one or more end user devices such that the number of delivery storage medium units utilized is increased when the number of end user device(s) exceeds the predetermined number, wherein said information data are divided into a predetermined number of data groups, and the information data are divided into T (T=2,3,4 . . . ) sentences, wherein T depends on the number of channels, wherein the predetermined number of data groups is recorded in the storage medium unit in such changed order that Nth (N–1,2,3,4 . . . ) data group of the last sentence of the information data appears after the Nth data group of the first sentence and wherein said routing means deliver a continuous stream of information data to the end device by switching said data groups from the storage medium unit between virtual channels.

2. An information server system according to claim 1, wherein said routing means comprises at least one ATM switch.

3. An information server system according to claim 1, wherein said information data are video and/or audio data.

4. An information server system according to claim 1, wherein said demand data include a public address assigned to the selected information data.

5. An information server system according to claim 1, provided with control means for controlling the storage medium unit according to the distribution control data so that the storage medium unit outputs the selected information data including routing information to the routing means.

6. An information server system according to claim 1, wherein the managing means provides program data for the output of visual information through display means and/or audio information through speaker means from the storage medium units on the at least one end user device.

7. An information server system according to claim 1, wherein the managing means provides program data for information retrieval to the at least one end user device.

8. An information server system according to claim 3, wherein said information retrieval comprises video on demand.

9. An information server system according to claim 1, further comprising:

at least one second storage medium unit for storing second information data and connected with the routing means wherein the managing means comprises a table for storing data representing information data allocation to the first and second storage medium units, and wherein the managing means provides distribution control data for the first and second storage medium units based on the demand data from the at least one end user device.

10. An information server system according to claim 3, wherein said one or more storage medium units comprise:

memory means for storing video and/or audio data;

table means for memorizing data representing a relationship between the routing information and the video and/or audio data stored in the memory means;

program memory means for storing program data for controlling the one or more storage medium units; and at least one interface for transmitting the video and/or audio data with the routing information and a control signal in one or more packets to the routing means and for receiving the program data in one or more packets from the routing means.

11. An information server system according to claim 10, wherein said routing information relates to one or more virtual channels and said interface is an ATM interface.

12. An information server system according to claim 10, wherein said at least one interface receives control data representing a selected operation mode for the at least one end user device and wherein the controller controls the memory means according to the received control data so that the information data is reproduced from the memory means in the selected operation mode.

13. An information server system according to claim 12 wherein said operation mode comprises still mode, fast forward mode, reverse mode and/or mosaic mode.

14. An information server system according to claim 3, wherein said video and/or audio data is divided in a predetermined number of data groups, wherein the predetermined number of data groups is recorded in a sequence different from an original sequence on a recording medium in said one or more storage medium units and wherein said routing means delivers continuous video and/or audio data to the at least one end user device by switching said data groups from said one or more storage medium units to said one or more end user devices.

15. An information server system according to claim 14, wherein said recording medium is an agile disk and wherein a first portion of said data group is recorded on every N-ths (N=1,2,3 . . . ) track of the disk, and remaining portions of said data groups are recorded on remaining tracks of the disk.

16. An information server system according to claim 15, wherein the first portion of said data groups is reproduced by moving a head in a first direction and the remaining portion of the data groups is reproduced by moving the head in a second direction opposite to the first direction.

17. An information server system, for serving information data comprising video and/or audio data over one or more channels to one or more end user devices, comprising:

one or more storage medium units for storing information data selectable by a respective end user device, wherein each storage medium unit includes a controller for controlling a play mode of said information data stored;

managing means for managing distribution of the information data to any one of the end user devices, wherein the managing means receives demand data relating to information data selected by the user through a respective end user device, and wherein the managing means outputs distribution control data including channel information of the selected information data and routing information for said end user device;

wherein said controller controls the play mode of a respective storage medium unit in accordance with said distribution control data;

routing means for connecting the storage medium unit to the end user device, and for routing the information data from the storage medium unit and the distribution control data from the managing means; and wherein said video and/or audio data are divided into a predetermined number of data groups, and the video and/or audio data are divided into T (T=2,3,4 . . . ) sentences, wherein T depends on the number of channels, wherein the predetermined number of data groups is recorded in the storage medium unit in such changed order that Nth (N=1,2,3,4 . . . ) data group of the last sentence of the video data appears after the Nth data group of the first sentence and wherein said routing means deliver a continuous stream of video data to the end device by switching said data groups from the storage medium unit between virtual channels.

18. A system for serving information data over one or more channels to one or more end user devices, comprising:

a plurality of storage medium units for storing information data, wherein said plurality of storage medium units include an archive storage medium unit which contains said information data and a plurality of delivery storage medium units that stores said information data from said archive storage medium unit as needed;

managing means for managing distribution of the information data to any one of the end user devices, wherein the managing means receives demand data relating to information data selected through at least one respective end user device, and wherein the managing means outputs distribution control data including channel information of the selected information data and routing information for said at least one end user device; and routing means for connecting the one or more delivery storage medium units to the at least one end user device, and for routing the selected information data from the delivery storage medium units and the distribution control data from the managing means, wherein said managing means selects a special play mode for supplying an altered sequence of scenes to the at least one end user device by switching channels for supplying the data information to the at least one end user device, wherein said information data are divided into a predetermined number of data groups, and the information data are divided into T (T=2,3,4 . . . ) sentences, wherein T depends on the number of channels, wherein the predetermined number of data groups is recorded in the storage medium unit in such changed order that Nth (N=1,2,3,4 . . . ) data group of the last sentence of the information data appears after the Nth data group of the first sentence and wherein said routing means deliver a continuous stream of information data to the end device by switching said data groups from the storage medium unit between virtual channels.

19. A system for serving information data over one or more channels to one or more end user devices, comprising:

a plurality of storage medium units for storing information data, wherein said plurality of storage medium units include an archive storage medium unit which contains said information data and a plurality of delivery storage medium units that stores said information data from said archive storage medium unit as needed;

managing means for managing distribution of the information data to any one of the end user devices, wherein the managing means receives demand data relating to information data selected through at least one respective end user device, and wherein the managing means outputs distribution control data including channel information of the selected information data and routing information for said at least one end user device; and routing means for connecting the one or more delivery storage medium units to the at least one end user device, and for routing the selected information data from the delivery storage medium units and the distribution control data from the managing means, wherein said managing means selects a special play mode for supplying a mosaic of scenes to the at least one end user device by selecting scenes from different channels, wherein said information data are divided into a predetermined number of data groups, and the information data are divided into T (T=2,3,4 . . . ) sentences, wherein T depends on the number of channels, wherein the predetermined number of data groups is recorded in the storage medium unit in such changed order that Nth (N=1,2,3,4 . . . ) data group of the last sentence of the information data appears after the Nth data group of the first sentence and wherein said routing means deliver a continuous stream of information data to the end device by switching said data groups from the storage medium unit between virtual channels.

20. An information server system according to claim 1, further comprising navigation means for providing in a predetermined sequence menus which describe said information data.

21. An information server system according to claim 20, wherein said navigation means outputs to a respective end user device a software program for driving said respective end user device to select said menus in accordance with said predetermined sequence.

22. An information server system according to claim 1, wherein said distribution control data is in the form of a software program; wherein said managing means downloads said software program to said respective storage medium unit.

23. An information server system according to claim 1, wherein said one or more storage medium units includes an archive storage medium unit for archiving a plurality of distribution control data output by said managing means.

24. An information server system according to claim 23, wherein said one or more storage medium units include a delivery storage medium unit for storing said information data selected through the respective end user.

25. An information server system according to claim 1, wherein said one or more storage medium units store the information data according to said estimate data.

26. A system for serving information data over one or more channels to one or more end user devices, comprising:

a plurality of storage medium units for storing information data, wherein said plurality of storage medium units include an archive storage medium unit which contains said information data and a plurality of delivery storage medium units that stores said information data from said archive storage medium unit as needed;

managing means for managing distribution of the information data to any one of the end user devices, wherein the managing means receives demand data relating to information data selected through at least one respective end user device, and wherein the managing means outputs distribution control data including channel information of the selected information data and routing information for said at least one end user device; and routing means for connecting the one or more delivery storage medium units to the at least one end user device, and for routing the selected information data from the one or more storage medium units and the distribution control data from the managing means, wherein said distribution control data further includes backup control data for assigning one of said one or more delivery storage medium units to supply the selected information data when another of said one or more delivery storage medium units for supplying the selected information data is malfunctioning, wherein said information data are divided into a predetermined number of data groups, and the information data are divided into T (T=2,3,4 . . . ) sentences, wherein T depends on the number of channels, wherein the predetermined number of data groups is recorded in the storage medium unit in such changed order that Nth (N=1,2,3,4, . . . ) data group of the last sentence of the information data appears after the Nth data group of the first sentence and wherein said routing means deliver a continuous stream of information data to the end device by switching said data groups from the storage medium unit between virtual channels.

27. An information server system according to claim 26, wherein said one or more storage medium units store the information data according to said backup control data.

28. An information server system according to claim 27, wherein said managing means manages distribution of the information data according to said backup control data.

* * * * *